(12) United States Patent
Lee et al.

(10) Patent No.: US 10,169,632 B2
(45) Date of Patent: Jan. 1, 2019

(54) TOUCH-SENSING APPARATUS, TOUCH DEVICE INCLUDING THE APPARATUS, AND ELECTRONIC APPLIANCE

(71) Applicant: LG INNOTEK CO., LTD., Seoul (KR)

(72) Inventors: Ho Min Lee, Seoul (KR); Jin Seok Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 47 days.

(21) Appl. No.: 15/581,091

(22) Filed: Apr. 28, 2017

(65) Prior Publication Data
US 2017/0344788 A1 Nov. 30, 2017

(30) Foreign Application Priority Data

Apr. 29, 2016 (KR) .................. 10-2016-0052798
Jun. 15, 2016 (KR) .................. 10-2016-0074577

(51) Int. Cl.
*G06K 9/00* (2006.01)
*G06F 3/041* (2006.01)

(52) U.S. Cl.
CPC ....... *G06K 9/00013* (2013.01); *G06F 3/0412* (2013.01); *G06F 2203/04103* (2013.01); *G06F 2203/04106* (2013.01); *G06F 2203/04108* (2013.01)

(58) Field of Classification Search
CPC .............. G06K 9/00013; G06F 3/0412; G06F 2203/04103; G06F 2203/04108; G06F 2203/04106
See application file for complete search history.

(56) References Cited

U.S. PATENT DOCUMENTS

| | | | |
|---|---|---|---|
| 2010/0028610 A1* | 2/2010 | Fujii | ................. B32B 37/02 428/164 |
| 2010/0182267 A1 | 7/2010 | Lee et al. | |
| 2014/0300835 A1* | 10/2014 | Chu | ................. G06F 3/0412 349/12 |
| 2015/0101853 A1 | 4/2015 | Lee et al. | |
| 2017/0061193 A1* | 3/2017 | Young | ................. G06K 9/00013 |
| 2017/0205958 A1* | 7/2017 | Kurasawa | ............ G06F 3/0418 |

* cited by examiner

*Primary Examiner* — Abhishek Sarma
(74) *Attorney, Agent, or Firm* — Ked & Associates, LLP

(57) ABSTRACT

A touch sensing apparatus, touch devices including the touch sensing apparatus and electronic appliances including the touch sensing apparatus are provided. The touch sensing apparatus may include a substrate including an effective area and a non-effective area, a cavity provided in the non-effective area, a fingerprint sensor provided on a bottom surface of the cavity, and a first decorative layer provided inside the cavity and having a plurality of oxide layers. The first decorative layer may include at least one metal layer provided between the plurality of oxide layers. The metal layer may have a thickness ranging from 10 nm to 50 nm.

18 Claims, 17 Drawing Sheets

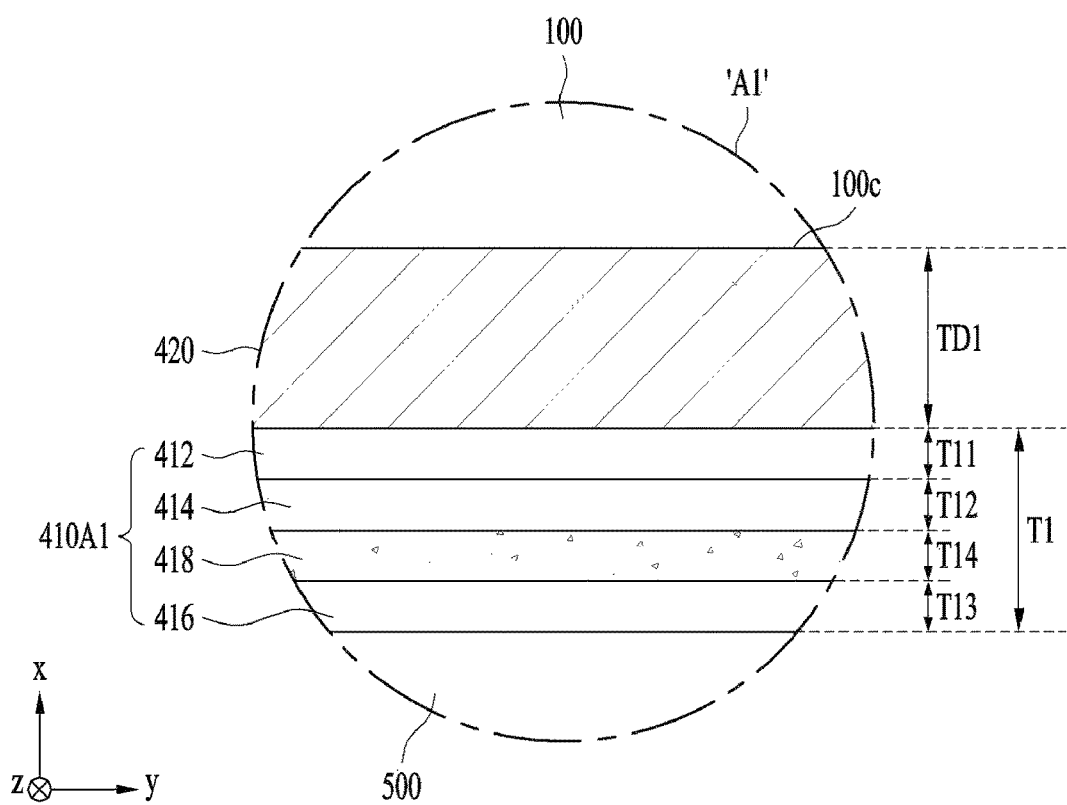

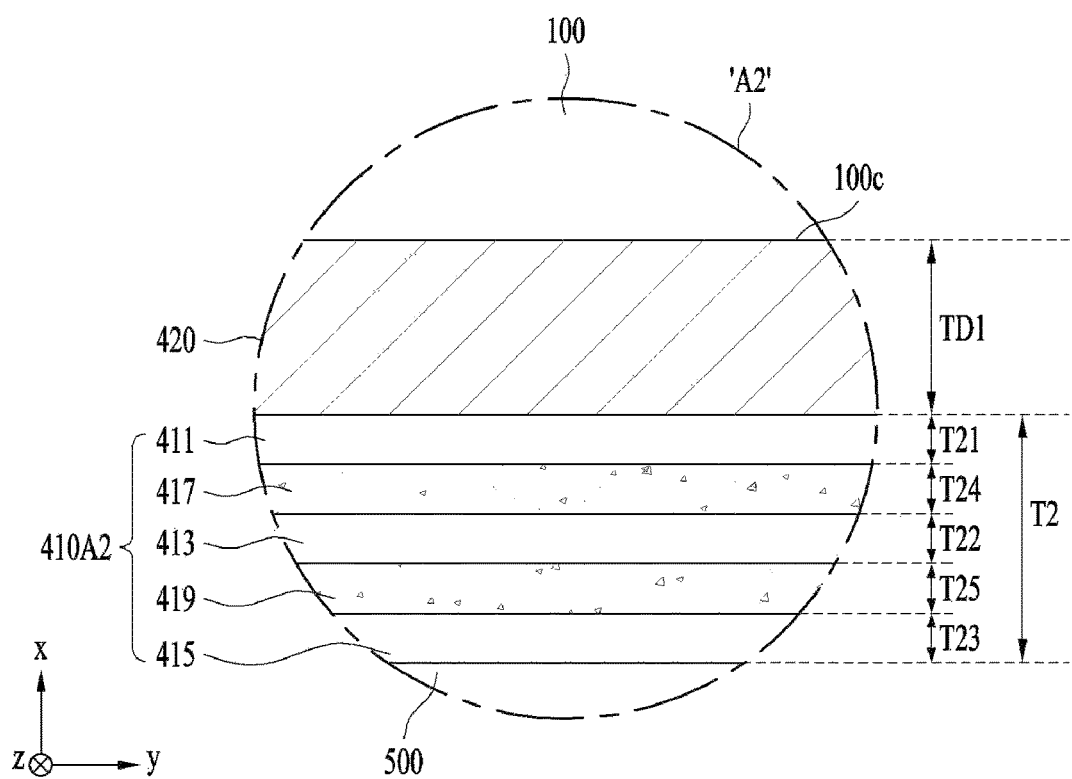

TOUCH-SENSING APPARATUS, TOUCH DEVICE INCLUDING THE APPARATUS, AND ELECTRONIC APPLIANCE

CROSS REFERENCE TO RELATED APPLICATIONS

This application claims priority under 35 U.S.C. § 119 to Korean Patent Application Nos. 10-2016-0052798, filed on Apr. 29, 2016, and 10-2016-0074577 filed on Jun. 15, 2016, whose entire disclosures are incorporated herein by reference.

BACKGROUND

1. Field

Embodiments relate to a touch-sensing apparatus, a touch device including the apparatus, and an electronic appliance.

2. Background

Fingerprint sensing techniques are widely used in personal identification such as, e.g., biometrics or authentication processes. For example, a fingerprint verification sensor or a fingerprint sensor may be used in order to grant access authority in an electronic appliance such as, for example, a smart phone. In a touch-sensing apparatus including such a fingerprint sensor, generally, the fingerprint sensor may be provided in an area or "non-effective area" excluding a display area or "effective area". After a separate blind hole is formed in the non-effective area of a cover substrate included in the touch-sensing apparatus, a button-type fingerprint sensor may be inserted into the blind hole.

In the non-effective area of the cover substrate, in order to cause, for example, a wiring electrode and a printed circuit board that connects the wiring electrode to an external circuit to be invisible from the outside, a material having a predetermined color may be applied to form a decorative layer. The decorative layer may be provided between the cover substrate and the fingerprint sensor.

Various attempts have recently been made in order to add a design to the decorative layer. In the case where the decorative layer is formed on a glass substrate by a pad-printing method, a metallic texture may be lowered compared to if the decorative layer is formed by a deposition method. Therefore, although an amount of metal particles included in the decorative layer may be increased in order to improve the metallic texture, noise may occur in sensor results of an electrostatic-type fingerprint sensor. Even when the decorative layer is formed by a deposition method, although the metallic texture improves compared to that achieved by a pad-printing method, noise may still occur in the sensor results of the electrostatic-type fingerprint sensor in a same manner as in the pad-printing method.

BRIEF DESCRIPTION OF THE DRAWINGS

The embodiments will be described in detail with reference to the following drawings in which like reference numerals refer to like elements wherein:

FIG. 7A and FIG. 7B are enlarged cross-sectional views respectively illustrating embodiments of portion "A" illustrated in FIG. 4;

DETAILED DESCRIPTION

Figure 1:
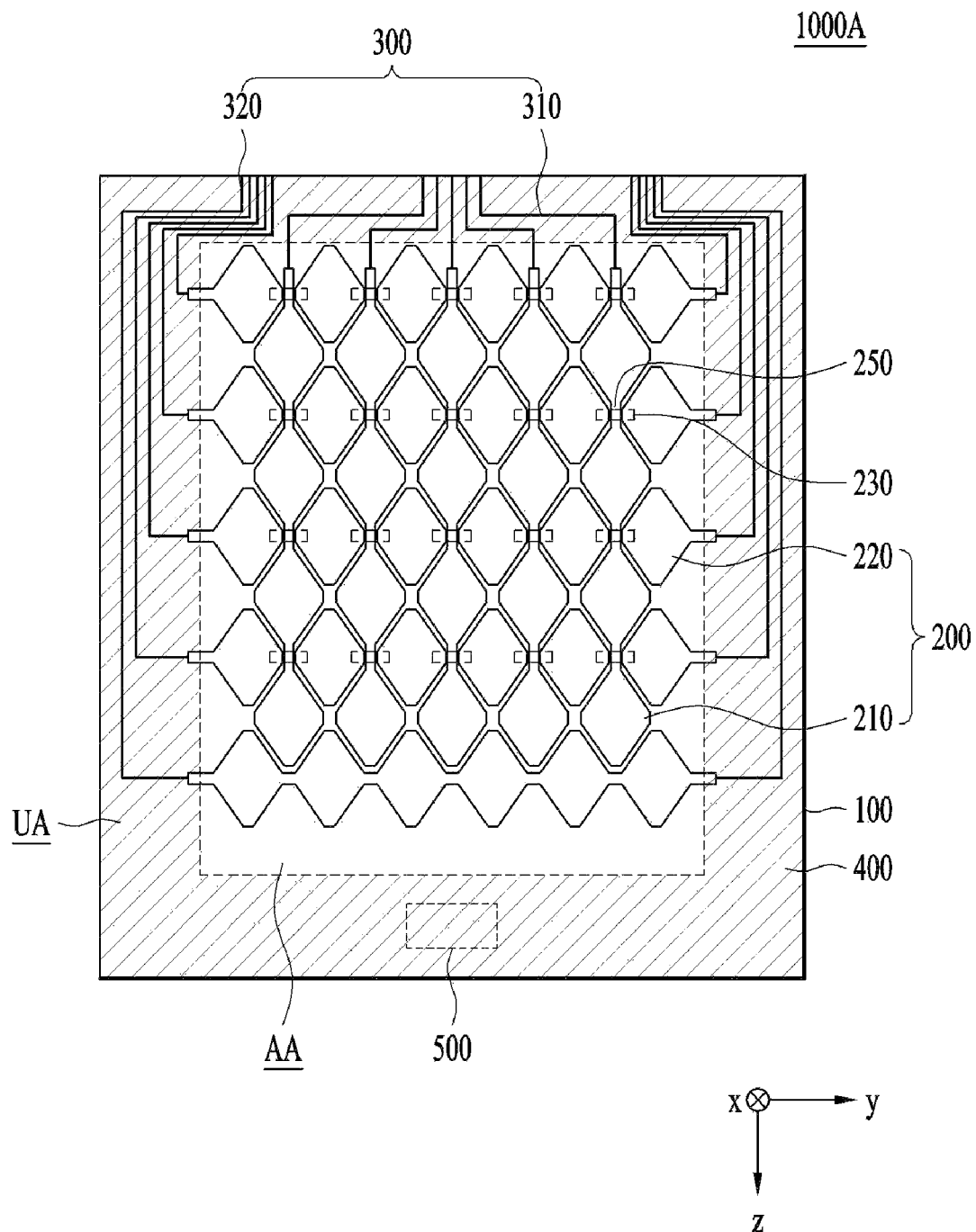
FIG. 1 is a plan view illustrating a touch-sensing apparatus according to an embodiment.

Touch-sensing apparatuses 1000A, 1000B, 1000C, and 1000D and touch devices 2000A to 2000C according to embodiments are described with reference to the accompanying drawings. Although the touch-sensing apparatuses 1000A, 1000B, 1000C, and 1000D and the touch devices 2000A to 2000C are described using the Cartesian coordinate system (the x-axis, the y-axis and the z-axis), they may of course be described using other coordinate systems. With the Cartesian coordinate system, although the x-axis, the y-axis and the z-axis are orthogonal to one another, the embodiments are not limited thereto. That is, the x-axis, the y-axis and the z-axis may cross one another, rather than being orthogonal to one another.

The touch-sensing apparatuses 1000A to 1000D according to the embodiments may correspond to any apparatus that includes a substrate 100 having a cavity portion or a recess or a blind hole H formed in a portion thereof and a functional sensor, such as, for example, a fingerprint sensor 500 inserted into the cavity portion H. Although the touch-sensing apparatuses 1000A to 1000D may further include a sensing electrode 200 and a wiring electrode 300, the embodiments are not limited to the specific positions at which the sensing electrode 200 and the wiring electrode 300 may be provided. That is, the sensing electrode 200 and the wiring electrode 300 may be provided in an add-on type, in an in-cell type, or in an on-cell type.

The touch-sensing apparatuses 1000A to 1000D according to the embodiments may further include a decorative layer 400, 400A or 400B. The decorative layer 400, 400A or 400B may be located around a functional sensor such as the fingerprint sensor 500, for example, at a location where the fingerprint sensor 500 may be located in a bezel area, which may be the edge of the touch-sensing apparatuses 1000A to 1000D. The decorative layer 400, 400A or 400B may assist in identification of the fingerprint sensor 500.

Referring to FIG. 1, the touch-sensing apparatus 1000A may include the substrate 100, the sensing electrode 200, the wiring electrode 300, the decorative layer 400, and the fingerprint sensor 500. The substrate 100 may include glass or plastic, and, for example, may include chemically reinforced/semi-reinforced glass such as, for example, soda lime glass or alumino silicate glass, may include reinforced or flexible plastic such as, for example, polyimide (PI), polyethylene terephthalate (PET), propylene glycol (PPG) or polycarbonate (PC), or may include sapphire, without being limited thereto. Since sapphire has excellent electrical properties such as dielectric permittivity, and is capable of innovatively increasing a touch response speed and easily realizing a spatial touch such as, for example, hovering, and has high surface strength, it may be a material of the substrate 100. Hovering means a technique that recognizes coordinates at a slight distance from a display.

The substrate 100 may include an optical isotropic film. The substrate 100 may include a cyclic olefin copolymer (COC), a cyclic olefin polymer (COP), optical isotropic polycarbonate (PC), or optical isotropic polymethylmethacrylate (PMMA), without being limited thereto. Although the substrate 100 may be bendable or may not be bendable, the embodiments are not limited as to the properties of the substrate 100.

The substrate 100 may be bendable while partially having a curved surface. A portion of the substrate 100 may have a flat surface and a remaining portion may have a curved surface. For example, an end of the substrate 100 may have a curved surface and be bendable, or may be bendable or foldable with including surface having a random curvature. The entire substrate 100 may be a flexible substrate having flexibility. If the substrate 100 is a curved substrate or a so-called bended substrate, the touch-sensing apparatus 1000A including the substrate 100 may be formed so as to be flexible, curved, or bendable. Thus, the touch-sensing apparatus 1000A according to the embodiment may be portable and may have any of various modified designs.

The substrate 100 may cover all or part of the front surface or the back surface of the touch-sensing apparatus 1000A. The substrate 100 may be divided into an effective area AA and a non-effective area UA or a bezel area. The effective area AA may be defined as a display area, and the non-effective area UA may be defined as a non-display area that is provided around the effective area AA.

When a touch subject or an input device touches at least one of the effective area AA or the non-effective area UA, the touch-sensing apparatus 1000A may sense a touched position. The input device may be, for example, a finger or a stylus pen. For example, when the input device such as a finger touches the touch-sensing apparatus 1000A, the portion touched by the input device undergoes variation in capacitance. Thus, the touch-sensing apparatus 1000A may detect a corresponding portion as a touched position.

The sensing electrode 200 and the wiring electrode 300 may be provided on the substrate 100. The substrate 100 may serve to support the sensing electrode 200 and the wiring electrode 300. A separate subsidiary substrate may further be provided on the substrate 100. In this case, the sensing electrode 200 and the wiring electrode 300 may be supported by the subsidiary substrate, and the subsidiary substrate and the substrate 100 may be directly or indirectly adhered to each other using, for example, an adhesive. The subsidiary substrate in addition to the substrate 100 may be advantageous for mass production of the touch-sensing apparatus 1000A.

The sensing electrode 200 may be provided in the effective area AA of the substrate 100, and may include a first sensing electrode 210 and a second sensing electrode 220. The first sensing electrode 210 and the second sensing electrode 220 may extend in different directions and may be provided on the substrate 100. The first sensing electrode 210 may extend in a first direction, e.g. the z-axis direction, in the effective area AA of the substrate 100 and may be provided on one surface of the substrate 100. The second sensing electrode 220 may extend in a second direction, e.g. the y-axis direction, which may be different from the first direction, in the effective area AA of the substrate 100 and may be provided on one surface of the substrate 100. As such, the first sensing electrode 210 and the second sensing electrode 220 may be provided on a same surface of the substrate 100 and may be provided so as to extend in different directions.

The first sensing electrode 210 and the second sensing electrode 220 may be provided on the substrate 100 so as to be insulated from each other. The first sensing electrode 210 may include multiple first unit sensing electrodes connected to each other, and the second sensing electrode 220 may include multiple second unit sensing electrodes connected to each other. The multiple first unit sensing electrodes may be provided so as to be electrically spaced apart from the multiple second unit sensing electrodes.

The multiple second unit sensing electrodes may be connected to each other via a bridge electrode 230. The multiple second unit sensing electrodes may be electrically spaced apart from the multiple first unit sensing electrodes by an insulating material 250, which may be provided on a portion in which the bridge electrode 230 is provided. As such, the first sensing electrode 210 and the second sensing electrode 220 may be insulated from each other, rather than coming into contact with each other, and may be provided on the same surface in the effective area AA of the substrate 100.

At least one sensing electrode of the first sensing electrode 210 or the second sensing electrode 220 may include a transparent conductive material that enables the flow of electricity without preventing the transmission of light. For example, although each of the first and second sensing electrodes 210 and 220 may include at least one of indium tin oxide, indium zinc oxide, copper oxide, tin oxide, zinc oxide, or titanium oxide, the embodiment is not limited thereto. When each of the first and second sensing electrodes 210 and 220 is formed of a transparent material, a degree of freedom may be improved when a pattern of the first and second sensing electrodes 210 and 220 is formed in the effective area AA.

At least one of the first sensing electrode 210 or the second sensing electrode 220 may include at least one of a nanowire, photosensitive nanowire film, carbon nanotube (CNT), graphene, or conductive polymer, or a mixture thereof. Thus, when the touch-sensing apparatus 1000A is manufactured so as to be flexible and/or bendable, freedom in the design thereof may be improved. For example, when the first or second sensing electrode 210 or 220 is formed of a nano composite, such as a nanowire or carbon nanotube (CNT), the first or second sensing electrode 210 or 220 may be black and may freely change color and reflectivity thereof while achieving electrical conductivity via control of the content of nanopowder. Thus, the degree of freedom may be improved when the touch-sensing apparatus 1000A is manufactured so as to be flexible and/or bendable. At least one of the first sensing electrode 210 or the second sensing electrode 220 may include various metals. For example, the sensing electrode 200 may include at least one of chrome (Cr), nickel (Ni), copper (Cu), aluminum (Al), silver (Ag), molybdenum (Mo), gold (Au), or titanium (Ti), or at least one metal of alloys thereof.

At least one of the first sensing electrode 210 or the second sensing electrode 220 may be provided in a mesh form. When the sensing electrode 200 has a mesh form, the pattern of the sensing electrode 200 may be invisible in the effective area AA. Even when the sensing electrode 200 is formed of a metal, the pattern of the sensing electrode 200 may be invisible. Even when the sensing electrode 200 is applied to a touch-sensing apparatus 1000A having a large size, resistance of the touch-sensing apparatus 1000A may be reduced. The sensing electrode 200 and the wiring electrode 300 may be patterned at the same time using the same material.

The wiring electrode 300 may be provided in at least one area of the effective area AA or the non-effective area UA of the substrate 100. For example, as illustrated in FIG. 1, the wiring electrode 300 may be provided in the non-effective area UA of the substrate 100. The wiring electrode 300 may include a first wiring electrode 310 and a second wiring electrode 320, which may be provided in the non-effective area UA of the substrate 100.

The first wiring electrode 310 may include one end connected to the first sensing electrode 210, and the second wiring electrode 320 may include one end connected to the second sensing electrode 220. Another end of each of the first wiring electrode 310 and the second wiring electrode 320 may be connected to a circuit board. The circuit board may be any one of various shapes of circuit boards, and, for example, may be a flexible printed circuit board (FPCB). Each of the first wiring electrode 310 and the second wiring electrode 320 may include a conductive material. For example, the wiring electrode 300 may include a material that is the same as, similar to, or different from that of the above-described sensing electrode 200.

The decorative layer 400, 400A or 400B may be provided on the substrate 100. For example, the decorative layer 400, 400A or 400B may be provided in the non-effective area UA of the substrate 100. The fingerprint sensor 500 may be provided on the substrate 100. For example, the decorative layer 400, 400A or 400B may be provided on the substrate 100, and the fingerprint sensor 500 may be provided on the decorative layer 400, 400A or 400B. The fingerprint sensor 500 may be classified as an ultrasonic-type, infrared-type, or capacitive-type fingerprint sensor according to a principle of operation thereof. The fingerprint sensor 500 may perform a predetermined function, for example, at a time when a touch subject approaches or touches one surface of the touch-sensing apparatus 1000A.

Figure 2:
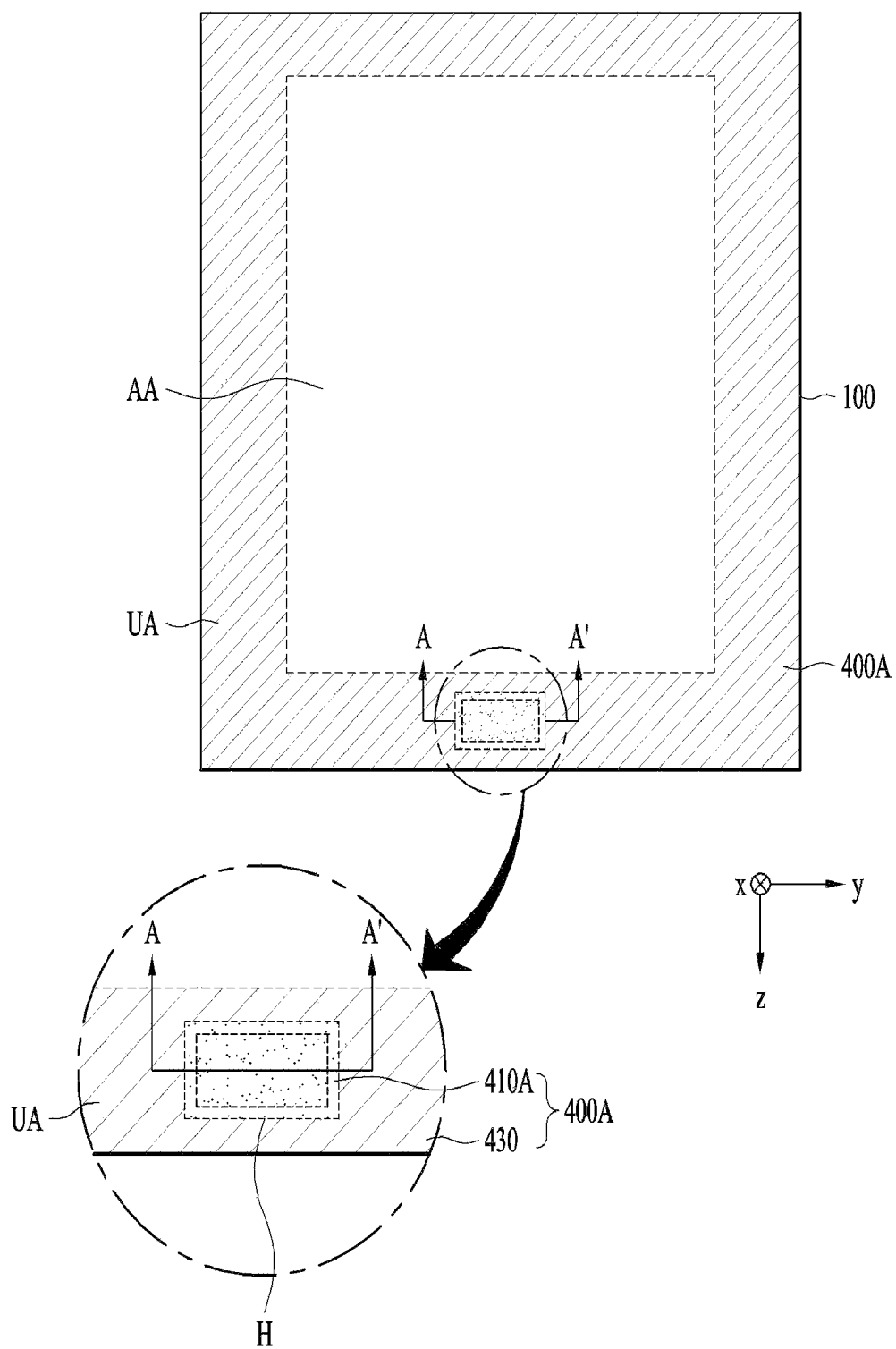
FIG. 2 is a plan view of a substrate and a decorative layer illustrated in FIG. 1.
Figure 3:
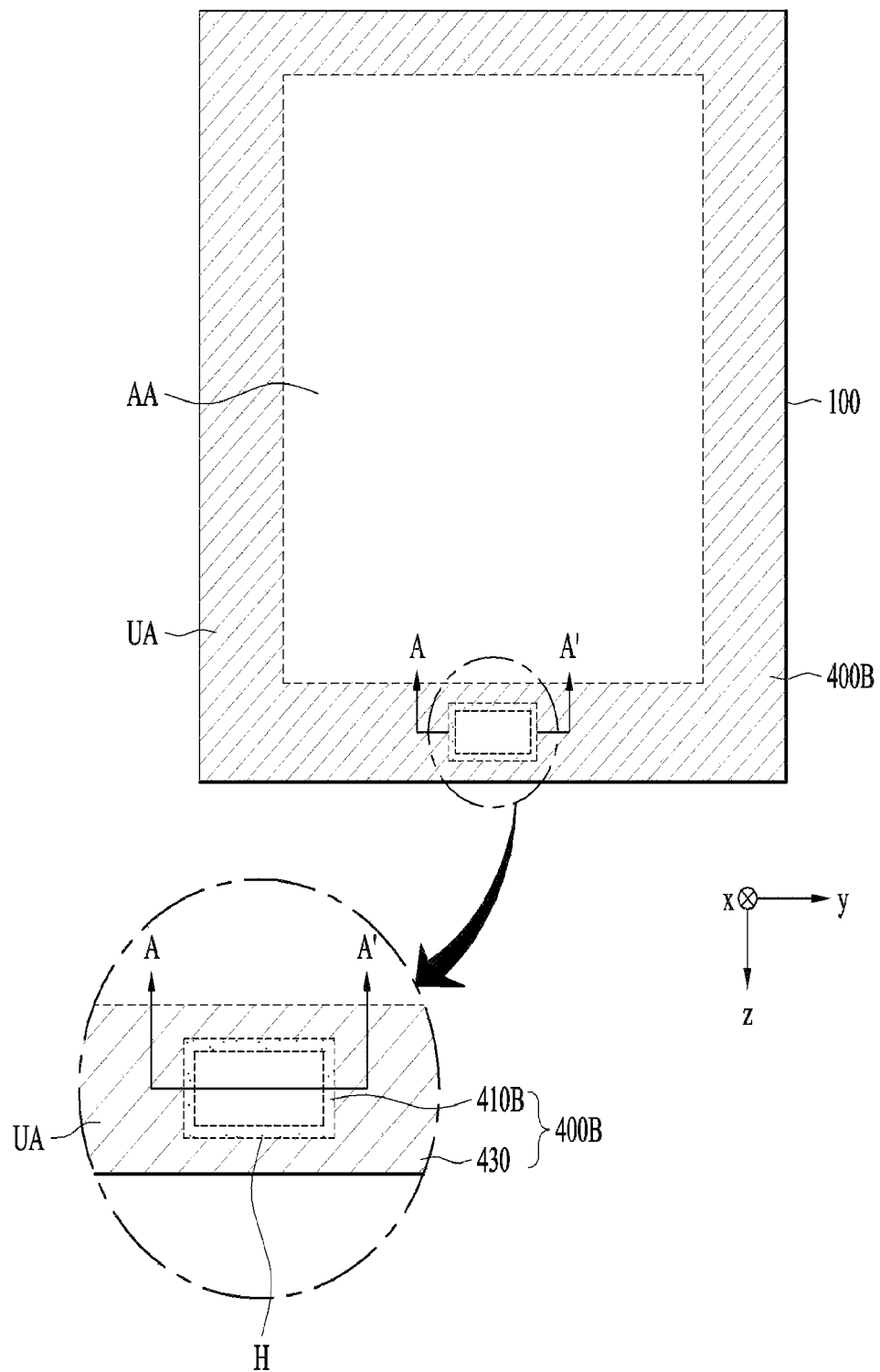
FIG. 3 is a plan view illustrating another embodiment of the substrate and the decorative layer illustrated in FIG. 1.
Figure 4:
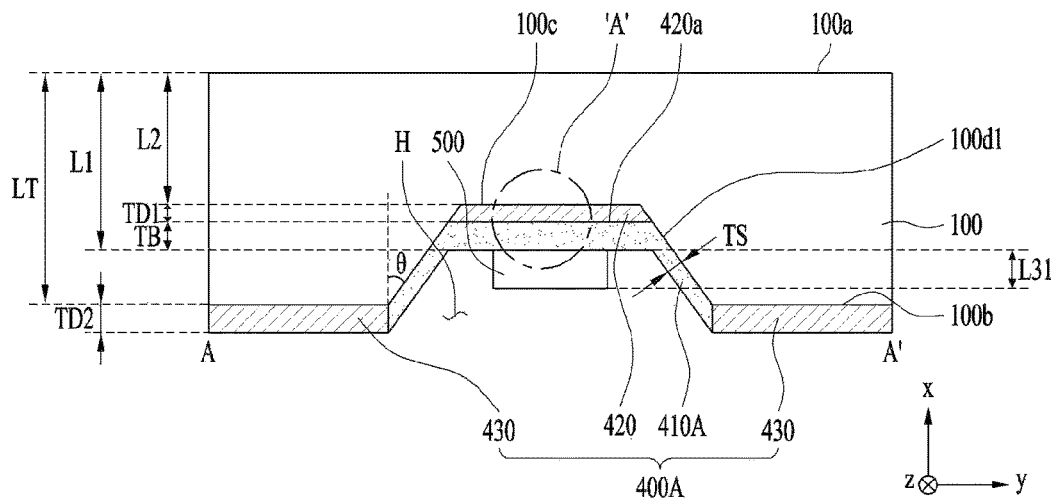
FIG. 4 is a cross-sectional view taken along line A-A' of FIG. 2.
Figure 5:
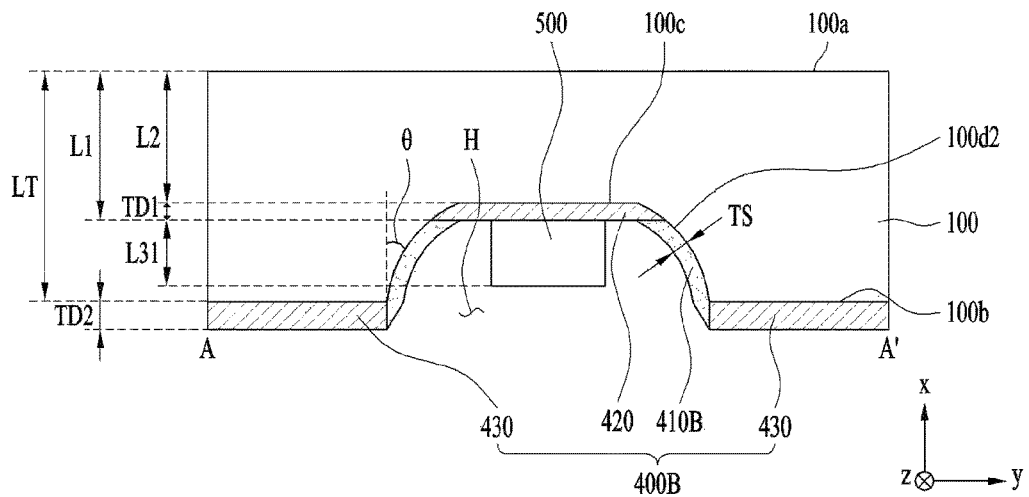
FIG. 5 is a cross-sectional view taken along line A-A' of FIG. 3.
Figure 6:
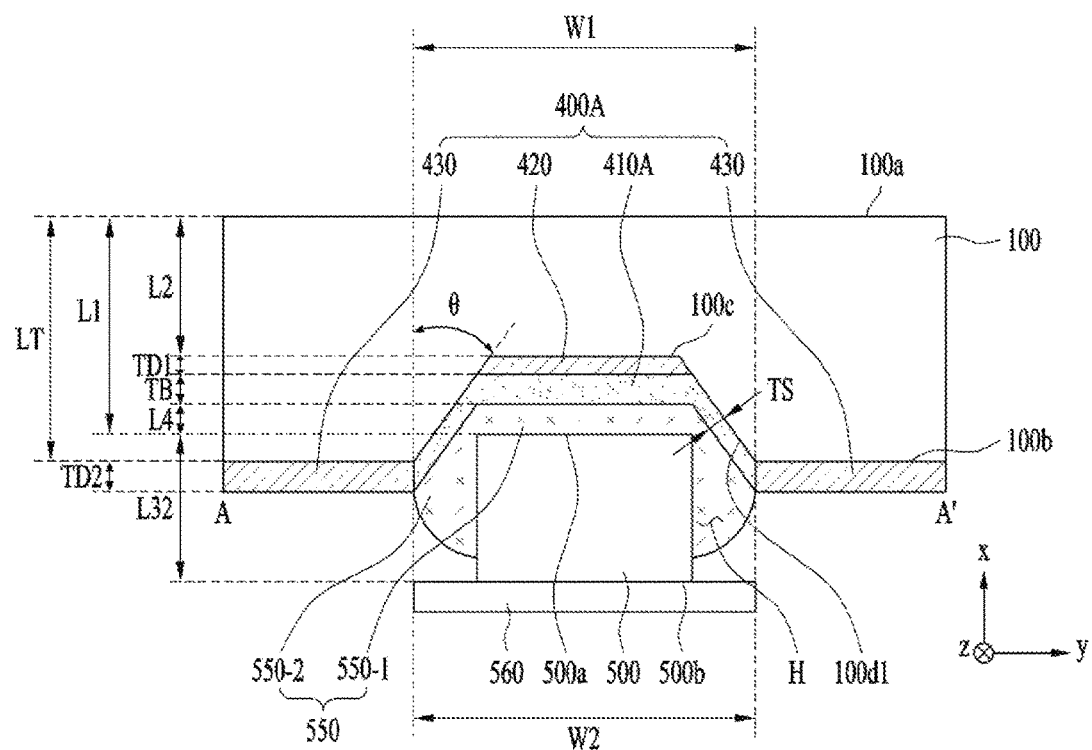
FIG. 6 is a cross-sectional view taken along line A-A' of FIG. 2 according to another embodiment.

FIG. 4 is a cross-sectional view taken along line A-A' of FIG. 2 according to an embodiment, FIG. 5 is a cross-sectional view taken along line A-A' of FIG. 3 according to one embodiment, and FIG. 6 is a cross-sectional view taken along line A-A' of FIG. 2 according to another embodiment. For convenience, fingerprint sensor 500, which is not illustrated in FIG. 2 and FIG. 3, is illustrated in FIG. 4 to FIG. 6.

The substrate 100 may include first and second surfaces 100a and 100b. The first surface 100a may be defined as a surface that a touch subject may touch, and the second surface 100b may be defined as a surface opposite the first surface 100a. As illustrated, the first surface 100a may be an upper surface of the substrate 100, and the second surface 100b may be a lower surface of the substrate 100. For example, although a total thickness LT of the substrate 100 may be 300 μm, the embodiment is not limited thereto.

The substrate 100 may include a cavity portion H formed in a portion of the non-effective area UA of the first or second surface 100a or 100b. For example, as illustrated in FIG. 4 to FIG. 6, although the cavity portion H may be formed in the non-effective area UA of the second surface 100b of the substrate 100, the embodiment is not limited thereto. As such, the second surface 100b of the substrate 100, which may be provided with the cavity portion H, may be stepped, whereas the first surface 100a of the substrate 100 may be a flat surface having no stepped portion.

When viewed in a plan, the cavity portion H may be provided at a lower side of the effective area AA, at an upper side of the effective area AA, or at a lateral side of the effective area AA, within the non-effective area UA of the substrate 100. For example, as illustrated in FIG. 2 or 3, the cavity portion H may be provided at the lower side of the effective area AA within the non-effective area UA.

The side surface $100d1$ or/and $100d2$ of the cavity portion H may be inclined at a predetermined angle θ relative to a virtual vertical plane that may be parallel to the thickness direction of the substrate 100, such as the x-axis direction. The side surface of the cavity portion H may be a flat surface $100d1$ as illustrated in FIG. 4 or FIG. 6, or may be a curved surface $100d2$ as illustrated in FIG. 5. The side surface $100d1$ of the cavity portion H illustrated in FIG. 4 or FIG. 6 may be replaced with the curved surface $100d2$ as illustrated in FIG. 5, or the side surface $100d2$ of the cavity portion H illustrated in FIG. 5 may be replaced with the flat surface $100d1$ illustrated in FIG. 4 or FIG. 6. The cavity portion H may have any of various plan shapes such as, for example, a polygonal shape or a circular shape. For example, as illustrated in FIG. 2 or FIG. 3, although the cavity portion H may have a rectangular plan shape, the embodiment is not limited thereto.

The decorative layer 400, 400A or 400B may serve to prevent at least one of the wiring electrode 300 provided in the non-effective area UA, the printed circuit board that connects the wiring electrode 300 to an external circuit, or the fingerprint sensor 500 from being visible from the outside. The decorative layer 400, 400A or 400B may be used, in the non-effective area UA of the touch-sensing apparatus 1000A, to achieve various decorations using, for example, geometrical designs such as, e.g., shapes, lines, figures, hairline shapes, and weave patterns, or to display logos, for example, shapes such as symbols, numbers, and characters. The decorative layer 400, 400A or 400B may be formed into a film. Thus, when the substrate 100 is flexible or includes a curved surface, the decorative layer 400, 400A or 400B may be easily provided on one surface of the substrate 100.

Referring to FIG. 4 to FIG. 6, the decorative layer 400, 400A or 400B may include a first decorative layer 410A or 410B, a second decorative layer 420, and a third decorative layer 430. The first decorative layer 410A or 410B may be provided inside the cavity portion H, which may be formed in the non-effective area UA of the substrate 100. The first decorative layer 410A or 410B may be provided on at least one of the bottom surface $100c$ or the side surface $100d1$ or $100d2$ of the cavity portion H. For example, as illustrated in FIG. 4 or FIG. 6, the first decorative layer 410A may be provided on each of the bottom surface $100c$ and the side surface $100d1$ of the cavity portion H.

As illustrated in FIG. 5, the first decorative layer 410B may be provided only on the side surface $100d2$ of the cavity portion H. The first decorative layer 410A of the touch-sensing apparatus 1000A illustrated in FIG. 4 or FIG. 6 may be provided only on the side surface 100*d*1 of the cavity portion H as illustrated in FIG. 5. The first decorative layer 410B of the touch-sensing apparatus 1000A illustrated in FIG. 5 may be provided not only on the side surface 100*d*1, but also on the bottom surface 100*c* of the cavity portion H, as illustrated in FIG. 4 or FIG. 6.

As illustrated in FIG. 2 or FIG. 3, the first decorative layer 410A or 410B may have a ring shape. The second decorative layer 420 may be provided to be provided between the bottom surface 100*c* of the cavity portion H and the fingerprint sensor 500. In FIG. 4 or FIG. 6, since the first decorative layer 410A is provided between the fingerprint sensor 500 and the bottom surface 100*c* of the cavity portion H, the second decorative layer 420 may be provided between the bottom surface 100*c* of the cavity portion H and the first decorative layer 410A. The third decorative layer 430 may be provided in a portion of the non-effective area UA excluding the cavity portion H, i.e. around the cavity portion H.

Referring to FIG. 4 or FIG. 6, a thickness TB of the first decorative layer 410A provided on the bottom surface 100*c* of the cavity portion H may be different from, or may be the same as a thickness TS of the first decorative layer 410A provided on the side surface 100*di* of the cavity portion H. For example, although the thickness TB on the bottom surface 100*c* may be greater than the thickness TS on the side surface 100*dl*, the embodiment is not limited thereto.

A thickness TD1 of the second decorative layer 420 may be the same as, or may be different from a thickness TD2 of the third decorative layer 430. For example, although the respective thicknesses TD1 and TD2 of the second and third decorative layers 420 and 430 may range from 2 μm to 10 μm, and, for example, may range from 2 μm to 4 μm, the embodiment is not limited thereto. The thickness TB or TS of the first decorative layer 410A or 410B may be less than the thickness TD1 or TD2 of the second or third decorative layer 420 or 430.

A structure of the second decorative layer 420 may be the same as, or may be different from a structure of the third decorative layer 430. When the second and third decorative layers 420 and 430 have the same color or similar colors, the non-effective area UA may be shown to attain a sense of unity. When the second and third decorative layers 420 and 430 have different colors, the area in which the fingerprint sensor 500 is provided may be easily identified from outside.

For example, each of the second and third decorative layers 420 and 430 may be formed by applying a material having a predetermined color. Each of the second and third decorative layers 420 and 430 may have a desired color suitable for the exterior appearance. For example, each of the second and third decorative layers 420 and 430 may include a black or white pigment, and thus may be black or white. Each of the second and third decorative layers 420 and 430 may be formed using, for example, a film so as to be various colors such as white, black, red, or blue.

In the case where the decorative layer 400, 400A or 400B further includes the first decorative layer 410A or 410B, the area in which the fingerprint sensor 500 may be provided, i.e. the cavity portion H in which the first decorative layer 410A or 410B is provided, may be further easily identified from the outside. The fingerprint sensor 500 may be provided on the bottom surface 100*c* of the cavity portion H. In FIG. 4 or FIG. 6, since the first decorative layer 410A is formed on the bottom surface 100*c* of the cavity portion H, the fingerprint sensor 500 may be provided on the first decorative layer 410A, which may be formed on the bottom surface 100*c* of the cavity portion H.

In FIG. 5, since the first decorative layer 410B is not provided on the bottom surface 100*c* of the cavity portion H, the fingerprint sensor 500 may be provided on the second decorative layer 420. Although the fingerprint sensor 500 may be provided on a flat surface portion, which may be the central area of the cavity portion H inside the cavity portion H, the embodiments are not limited as to a particular position at which the fingerprint sensor 500 may be provided.

When the thickness L31 of the fingerprint sensor 500 is small or the depth of the cavity portion H is large, as illustrated in FIG. 4 or FIG. 5, the entire fingerprint sensor 500 may be located inside the cavity portion H. When the thickness L32 of the fingerprint sensor 500 is large or the depth of the cavity portion H is small, as illustrated in FIG. 6, only a portion of the fingerprint sensor 500 may be provided inside the cavity portion H. Although the thickness L32 of the fingerprint sensor 500 may be, for example, 830 μm, the embodiment is not limited thereto.

Although the touch-sensing apparatus 1000A, as illustrated in FIG. 6, may further include a first adhesive layer 550 and an auxiliary substrate 560, the embodiment is not limited thereto. In some cases, at least one of the first adhesive layer 550 or the auxiliary substrate 560 may be omitted. For example, as illustrated in FIG. 4 or FIG. 5, the first adhesive layer 550 and the auxiliary substrate 560 may be omitted.

The first adhesive layer 550 may be provided between at least one of the bottom surface 100*c* or the side surface 100*d*1 of the cavity portion H and the fingerprint sensor 500. For example, the first adhesive layer 550 may include first and second adhesive portions 550-1 and 550-2. The first adhesive portion 550-1 may be provided between the bottom surface 100*c* of the cavity portion H and the fingerprint sensor 500. The second adhesive portion 550-2 may extend from the first adhesive portion 550-1 and may be provided between the side surface 100*dl* of the cavity portion H and the fingerprint sensor 500.

As illustrated in FIG. 6, when the first decorative layer 410A is provided on each of the bottom surface 100*c* and the side surface 100*dl* of the cavity portion H, the first adhesive portion 550-1 of the first adhesive layer 550 may be provided between the first decorative layer 410A and the fingerprint sensor 500. However, when the first decorative layer 410A illustrated in FIG. 6 is replaced with the first decorative layer 410B illustrated in FIG. 5, the first adhesive portion 550-1 of the first adhesive layer 550 may be provided between the second decorative layer 420 and the fingerprint sensor 500.

When the thickness L4 of the first adhesive portion 550-1 is less than 10 μm, adhesive force of the first adhesive layer 550 may be reduced. When the thickness L4 is greater than 40 μm, the distance L1 between the fingerprint sensor 500 and the first surface 100*a* of the substrate 100 increases, which may cause deterioration in the sensitivity of the fingerprint sensor 500. Although the thickness L4 of the first adhesive portion 550-1 may range from 10 μm to 40 μm, the embodiment is not limited thereto. In addition, the first adhesive layer 550 may be an adhesive material such as, for example, a resin, but the embodiments are not limited as to any particular material for the first adhesive layer 550.

As described above, if the first adhesive layer 550 is provided, the fingerprint sensor 500 may be firmly attached to the first decorative layer 410A or the second decorative layer 420, thus having a reduced possibility of separation due to external shocks. Therefore, the reliability of the touch-sensing apparatus 1000A may be improved.

The fingerprint sensor 500 may include a third surface 500a that may face the bottom surface 100c of the cavity portion H, and a fourth surface 500b that may be opposite to the third surface 500a. The auxiliary substrate 560 may be provided on the fourth surface 500b of the fingerprint sensor 500. Although the auxiliary substrate 560 may correspond to the above-described subsidiary substrate, or a flexible printed circuit board FPCB, the embodiment is not limited thereto.

In addition, referring to FIG. 6, a width W1 of the opening in the cavity portion H may be the same as a width W2 of the auxiliary substrate 560, or may be less than the width W2 of the auxiliary substrate 560. The opening in the cavity portion H may correspond to an entrance of the cavity portion H, which may be formed in the second surface 100b of the substrate 100. As such, when the width W1 of the opening in the cavity portion H is the same as or less than the width W2 of the auxiliary substrate 560, the second adhesive portion 550-2, which may be provided on the side surface 100d1 of the cavity portion H, may be hidden so as to be invisible from the outside.

The first decorative layer 410A or 410B may include multiple oxide layers and at least one metal layer. Although only the first decorative layer 410A provided between the bottom surface 100c of the cavity portion H and the fingerprint sensor 500, among the first decorative layer 410A illustrated in FIG. 4, will be described, this description related to the first decorative layer 410A may be applied to not only the first decorative layer 410A, which may be provided on the side surface 100d1 of the cavity portion H illustrated in FIG. 4, but also the first decorative layer 410B or 410A illustrated in FIG. 5 or FIG. 6.

FIG. 7A and FIG. 7B are enlarged cross-sectional views respectively illustrating embodiments A1 and A2 of portion "A" illustrated in FIG. 4. Reference numerals 410A1 and 420A2 designate embodiments of the first decorative layer 410A.

The multiple oxide layers may be provided on at least one of the first and second surfaces 100a or 100b of the substrate 100. When the cavity portion H is formed in the second surface 100b of the substrate 100, although the multiple oxide layers may be provided on at least one of the bottom surface 100c or the side surface 100d1 or 100d2 of the cavity portion H, formed on the second surface 100b of the substrate 100, the embodiment is not limited thereto.

According to an embodiment, as illustrated in FIG. 7A, the multiple oxide layers constituting the first decorative layer 410A1 may include first to third oxide layers 412, 414, and 416. Although the first oxide layer 412 may be provided on the second decorative layer 420, provided on the bottom surface 100c of the cavity portion H in the substrate 100, the embodiment is not limited thereto. If the second decorative layer 420 is omitted, the first oxide layer 412 may be provided on the bottom surface 100c of the cavity portion H. The second oxide layer 414 may be provided on the first oxide layer 412, and the third oxide layer 416 may be provided on the second oxide layer 414.

According to another embodiment, as illustrated in FIG. 7B, the multiple oxide layers constituting the first decorative layer 410A2 may include first to third oxide layers 411, 413, and 415. Although the first oxide layer 411 may be provided on the second decorative layer 420, provided on the bottom surface 100c of the cavity portion H in the substrate 100, the embodiment is not limited thereto. If the second decorative layer 420 is omitted, the first oxide layer 411 may be provided on the bottom surface 100c of the cavity portion H. The second oxide layer 413 may be provided on the first oxide layer 411, and the third oxide layer 415 may be provided on the second oxide layer 413.

Each of the multiple oxide layers, for example, each of the first oxide layer 411 or 412, the second oxide layer 413 or 414, and the third oxide layer 415 or 416 may include at least one of titanium dioxide ($TiO_2$), silicon dioxide ($SiO_2$), aluminum oxide ($Al_2O_3$), hafnium oxide ($HfO_2$), zinc oxide (ZnO), magnesium oxide (MgO), cesium oxide ($Ce_2O_3$), indium oxide ($In_2O_3$), indium tin oxide (ITO), or barium titanate ($BaTiO_3$), but the embodiment is not limited thereto.

Each of the thicknesses of the multiple oxide layers, for example, the first thickness T11 or T21 of the first oxide layer 412 or 411, the second thickness T12 or T22 of the second oxide layer 414 or 413, and the third thickness T13 or T23 of the third oxide layer 416 or 415 may be tens of nm, for example, 10 nm, but the embodiment is not limited thereto.

The thicknesses of the multiple oxide layers included in the first decorative layer 410A, 410B, 410A1 or 410A2 may be different from, or may be the same as one another. For example, the first to third thicknesses T11, T12 and T13 of the first to third oxide layers 412, 414, and 416 shown in FIG. 7A may be the same as, or may be different from one another. Alternatively, the first to third thicknesses T21, T22 and T23 of the first to third oxide layers 411, 413, and 415 shown in FIG. 7B may be the same as, or may be different from one another.

The at least one metal layer included in the first decorative layer 410A, 410B, 410A1, or 410A2 may be provided between the multiple oxide layers. As illustrated in FIG. 7A, the at least one metal layer may include a first metal layer 418. The first metal layer 418 may be provided between the second oxide layer 414 and the third oxide layer 416. In FIG. 7A, although the first metal layer 418 is illustrated as being provided between the second oxide layer 414 and the third oxide layer 416, the embodiment is not limited thereto. That is, the first metal layer 418 may be provided between the first oxide layer 412 and the second oxide layer 414.

According to another embodiment, the at least one metal layer may include multiple metal layers. For example, as illustrated in FIG. 7B, the at least one metal layer may include second and third metal layers 417 and 419. The second metal layer 417 may be provided between the first oxide layer 411 and the second oxide layer 413. The third metal layer 419 may be provided between the second oxide layer 413 and the third oxide layer 415.

For example, each of the first, second, and third metal layers 418, 417, and 419 may include at least one of indium (In), tin (Sn), aluminum (Al), silver (Ag), nickel (Ni), chromium (Cr), platinum (Pt), molybdenum (Mo), copper (Cu), or gold (Au), or an alloy thereof, but the embodiment is not limited thereto.

As illustrated in FIG. 7A, the at least one metal layer may be a single layer 418, and as illustrated in FIG. 7B, the at least one metal layer may be multiple layers 417 and 419. Although the number of oxide layers is illustrated as being three in each of FIG. 7A and FIG. 7B, the embodiments are not limited thereto. The number of oxide layers may be 2, or may exceed 3. Although the number of the at least one metal layer is illustrated as being 1 or 2 in FIG. 7A or FIG. 7B, the embodiments are not limited thereto. When the number of oxide layers is 2, a single metal layer may be provided, and when the number of oxide layers exceeds 3, the number of metal layers may exceed 2.

If the at least one metal layer is a single layer as illustrated in FIG. 7A and the fourth thickness T14 of the single metal layer 418 is less than 10 nm, the first decorative layer 410A1 having a ring shape may exert a reduced metallic texture effect. Alternatively, if the fourth thickness T14 of the single metal layer 418 is greater than 50 nm, noise may occur in the sensing result of the fingerprint sensor 500, which may be of an electrostatic operation type, sensing a touch by a touch subject on the first surface 100a of the substrate 100, which may cause deterioration in the sensitivity of the fingerprint sensor 500. Therefore, although the fourth thickness T14 of the single metal layer 418 may range from 10 nm to 50 nm, the embodiment is not limited thereto.

According to another embodiment, if the at least one metal layer includes multiple metal layers as illustrated in FIG. 7B and the sum of the thicknesses T24 and T25 of the metal layers 417 and 419 provided between the oxide layers 411, 413, and 415 is less than 10 nm, the metallic texture effect caused by the first decorative layer 410A2 having a ring shape may be weak. In addition, if the sum of the thicknesses T24 and T25 of the metal layers 417 and 419 is greater than 50 nm, noise may occur in the sensing result of the fingerprint sensor 500, which may be of an electrostatic operation type, sensing a touch by a touch subject on the first surface 100a of the substrate 100, which may cause deterioration in the sensitivity of the fingerprint sensor 500. Therefore, although the sum of the thicknesses of the metal layers may range from 10 nm to 50 nm, the embodiment is not limited thereto. The thicknesses of the metal layers may be different from, or may be the same as each other. For example, the thickness T24 of the second metal layer 417 may be the same as, or may be different from the thickness T25 of the third metal layer 419 illustrated in FIG. 7.

Experiments were performed on whether or not noise occurs in the sensing result of the fingerprint sensor 500 sensing a touch by a touch subject while varying the type of the multiple oxide layers, the type of the at least one metal layer, and the thickness of the at least one metal layer which are included in the first decorative layer 410A, 410B, 410A1, or 410A2, in the touch-sensing apparatus 1000A according to the above-described embodiments, as follows.

First, in the case where each of the first and third oxide layers 412 and 416 illustrated in FIG. 7A includes TiO$_2$, the second oxide layer 414 includes SiO$_2$, and the first metal layer 418 includes Sn, where the respective thicknesses T11, T12, and T13 of the first to third oxide layers 412, 414, and 416 are all set to 10 nm, whether or not noise occurs in the result sensed by the fingerprint sensor 500 was tested while varying the thickness T14 of the first metal layer 418 to 35 nm, 45 nm, and 55 nm, respectively. As a result, when the thickness T14 of the first metal layer 418 is 35 nm or 45 nm, which is less than 50 nm, no noise occurred in the result sensed by the fingerprint sensor 500. However, noise occurs in the result sensed by the fingerprint sensor 500 when the thickness T14 of the first metal layer 418 is 55 nm, which is greater than 50 nm.

In addition, in the case where each of the first and third oxide layers 411 and 415 illustrated in FIG. 7B includes TiO$_2$, the second oxide layer 413 includes SiO$_2$, the second metal layer 417 includes In, and the third metal layer 419 includes Sn, where the respective thicknesses T21, T22, and T23 of the first to third oxide layers 411, 413, and 415 are all set to 10 nm, whether or not noise occurs in the result sensed by the fingerprint sensor 500 was tested while varying the respective thicknesses T24 and T25 of the second and third metal layers 417 and 419. As a result, no noise occurs in the result sensed by the fingerprint sensor 500 when the thickness T24 of the second metal layer 417 is 20 nm, the thickness T25 of the third metal layer 419 is 30 nm, and thus the sum of the thicknesses T24 and T25 is 50 nm.

As described above, in the case of the touch-sensing apparatus 1000A according to the embodiments, even if the first decorative layer 410A, 410B, 410A1, or 410A2, which grants the metallic texture to the portion that is provided with the cavity portion H in which the fingerprint sensor 500 is located, includes a metal material, no noise occurs in the result sensed by the fingerprint sensor 500 because the thicknesses T14, T24, and T25 of the first to third metal layers 418, 417, and 419 included in the first decorative layer 410A, 410B, 410A1, or 410A2 ranges from 10 nm to 50 nm. As such, when no noise occurs in the result sensed by the fingerprint sensor 500, the shape or the color of the first decorative layer 410A, 410B, 410A1, or 410A2 may be changed in various ways.

In the case of a touch-sensing apparatus according to a comparative example, it was assumed that a layer the same as the third decorative layer 430 is formed, instead of the first decorative layer 410A or 410B, on the location where the first decorative layer 410A or 410B is provided, i.e. on at least one of the side surface 100d1 or 100d2 or the bottom surface 100c of the cavity portion H. The third decorative layer is very thick such that the thickness thereof ranges from 2 μm to 5 μm, whereas the first decorative layer 410A, 410B, 410A1, or 410A2 is very thin such that the total thicknesses TB, TS, T1, and T2 thereof ranges from 40 nm to 100 nm, and for example, ranges from 50 nm to 70 nm. Therefore, in the case of the touch-sensing apparatus 1000A according to the embodiment, since the thicknesses TB, TS, T1, and T2 of the first decorative layer 410A, 410B, 410A1, or 410A2 are less than that in the touch-sensing apparatus according to the comparative example manufactured by a printing method, the distance L1 between the fingerprint sensor 500 and the first surface 100a that is touched by a touch subject may be reduced, which may improve the sensitivity of the result sensed by the fingerprint sensor 500.

In addition, unlike the touch-sensing apparatus 1000A illustrated in FIG. 4 or FIG. 6 in which the first decorative layer 410A is provided on the bottom surface 100c of the cavity portion H, when the first decorative layer 410A is not provided on the bottom surface 100c of the cavity portion H as illustrated in FIG. 5, the distance L1 between the fingerprint sensor 500 and the first surface 100a of the substrate 100 may be further reduced, which may further improve the sensitivity of the result sensed by the fingerprint sensor 500.

In FIG. 4 to 6, the first distance L1 between the fingerprint sensor 500 and the first surface 100a of the substrate 100 that is touched by a touch subject may be equal to or less than 300 μm. For example, when the first distance L1 exceeds 300 μm, the distance between the fingerprint sensor 500 and the first surface 100a that is touched by a touch subject, for example, the finger, is excessively increased, which may cause deterioration in the sensitivity of the fingerprint sensor 500 depending on a fingerprint touch. Thus, in consideration of this, the thicknesses L2, TD1, TB and L4 may be determined.

The second distance L2 between the first surface 100a and the bottom surface 100c of the cavity portion H formed in the second surface 100b of the substrate 100 may range from approximately 50 μm to approximately 300 μm, and, for example, may be 250 μm. When the second distance L2 is less than 50 μm, the strength of the substrate 100 may be reduced. In addition, when the second distance L2 exceeds 300 μm, the distance L1 between the fingerprint sensor 500 and the first surface 100a that is touched by the human finger may increase as the thickness of the substrate 100 increases, which may deteriorate the sensitivity of the fingerprint sensor 500 depending on a fingerprint touch.

In the touch-sensing apparatus 1000A according to the above-described embodiments, the first decorative layer 410A, 410B, 410A1, or 410A2 may be formed on the substrate 100 by a deposition method, rather than a printing method. A method of manufacturing the touch-sensing apparatus 1000A according to the above-described embodiment illustrated in FIG. 4 is described with reference to the accompanying drawings. A method of manufacturing the touch-sensing apparatus 1000A illustrated in FIG. 4 is described, but the touch-sensing apparatus 1000A illustrated in FIG. 5 or FIG. 6 may be manufactured by modifying the manufacturing method described below. In addition, the touch-sensing apparatus 1000A illustrated in FIG. 4 may be manufactured by any other manufacturing method.

Figure 8A:
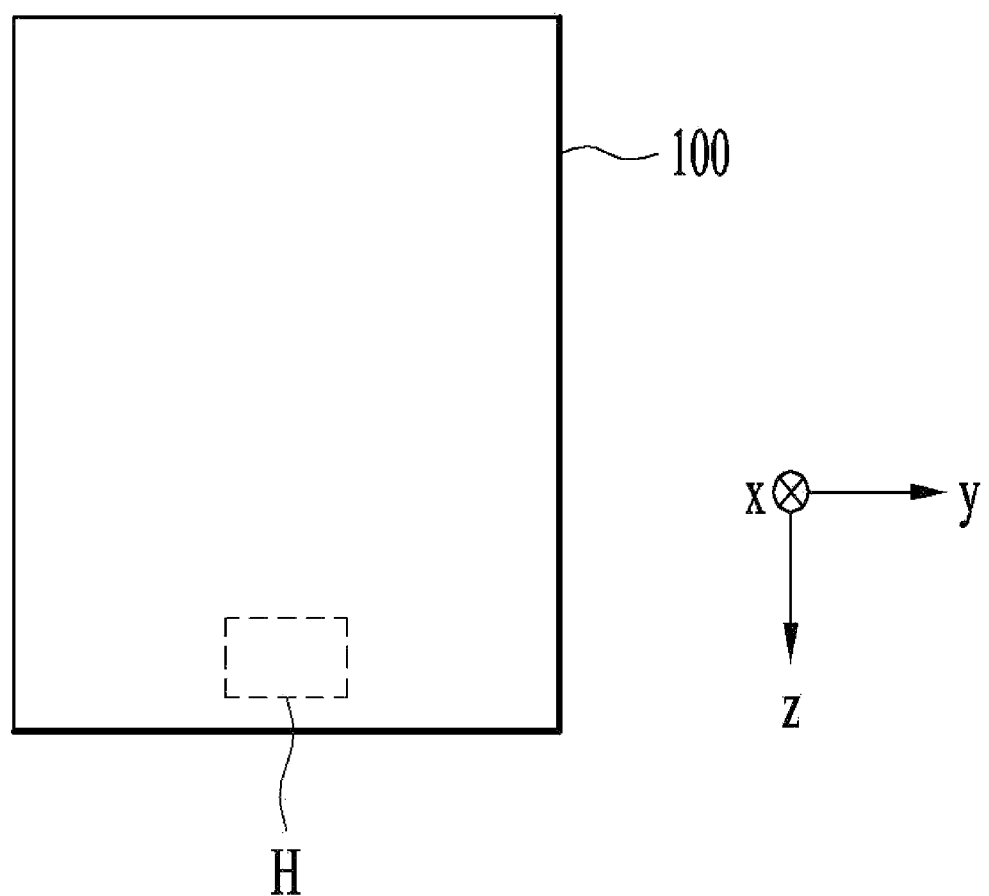
FIG. 8A to FIG. 8C are process plan views for explaining a method of manufacturing a touch-sensing apparatus according to the embodiment illustrated in FIG. 4.
Figure 8B:
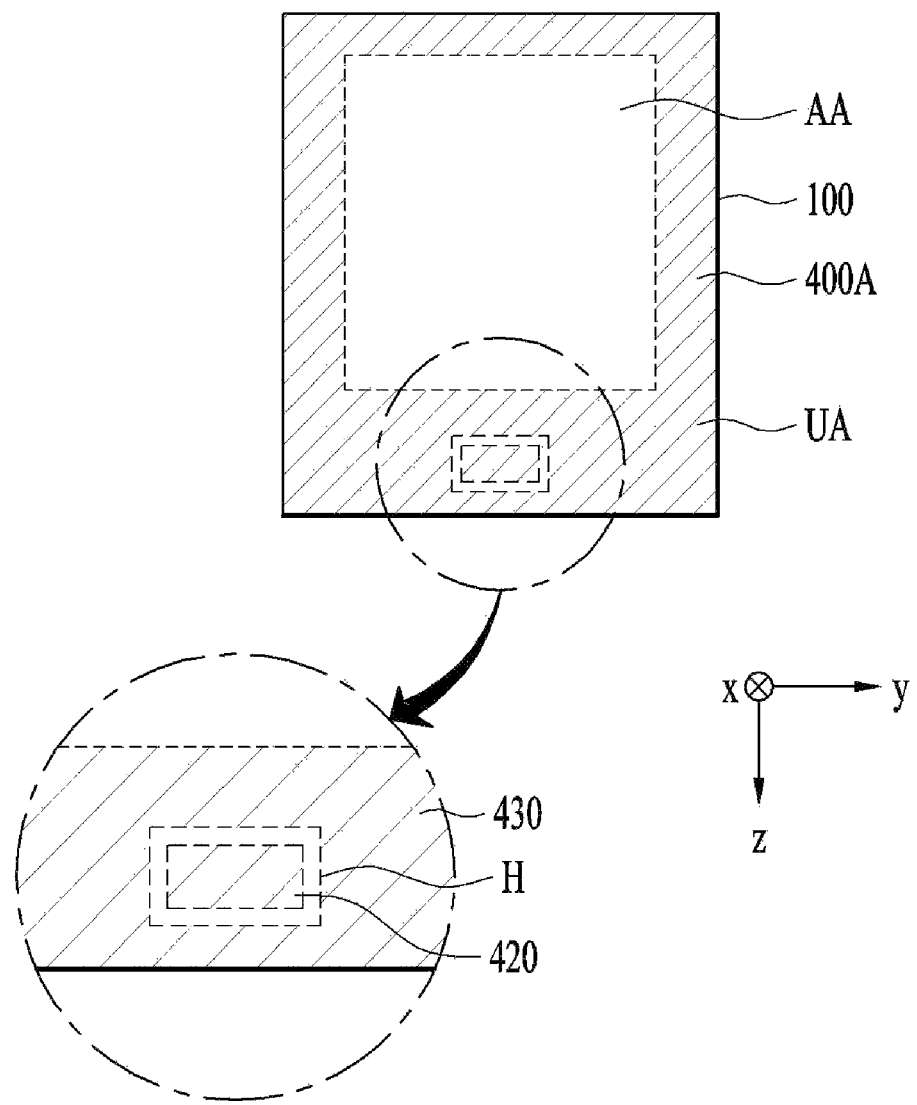
Figure 8C:
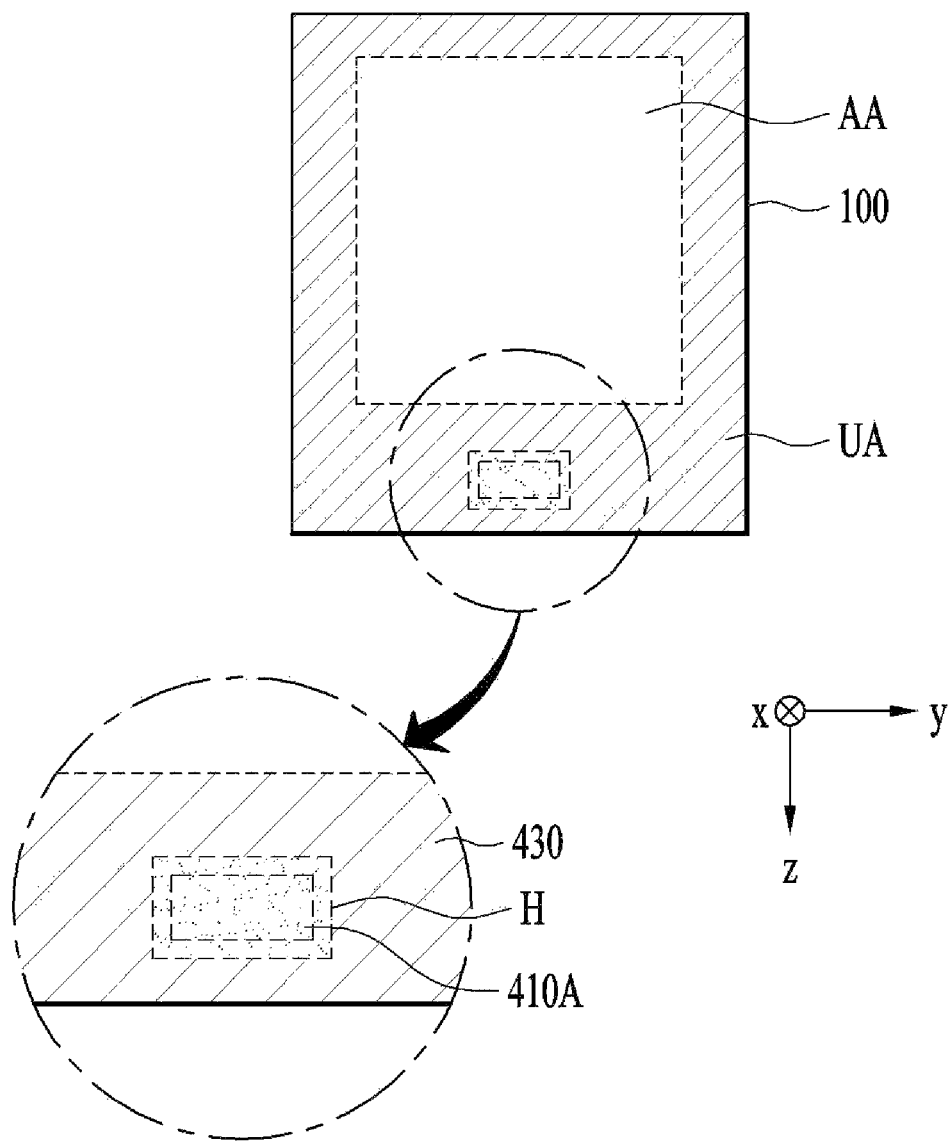
Figure 9A:
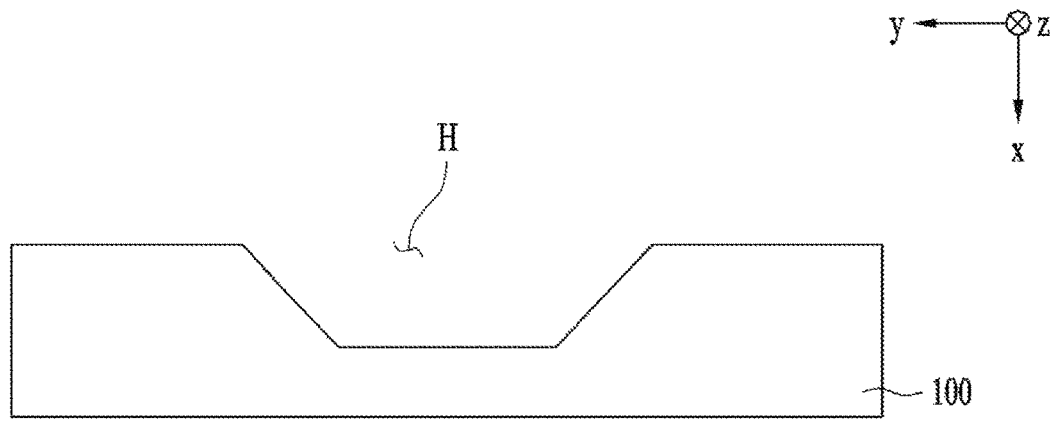
FIG. 9A to FIG. 9D are process cross-sectional views for explaining a method of manufacturing the touch-sensing apparatus according to the embodiment illustrated in FIG. 4.

FIG. 8A to FIG. 8C are process plan views for explaining a method of manufacturing the touch-sensing apparatus 1000A according to the embodiment illustrated in FIG. 4. FIG. 9A to FIG. 9D are process cross-sectional views for explaining a method of manufacturing the touch-sensing apparatus 1000A according to the embodiment illustrated in FIG. 4. Referring to FIG. 8A and FIG. 9A, the substrate 100 may be prepared. Thereafter, the cavity portion H may be formed in the prepared substrate 100.

Figure 9B:
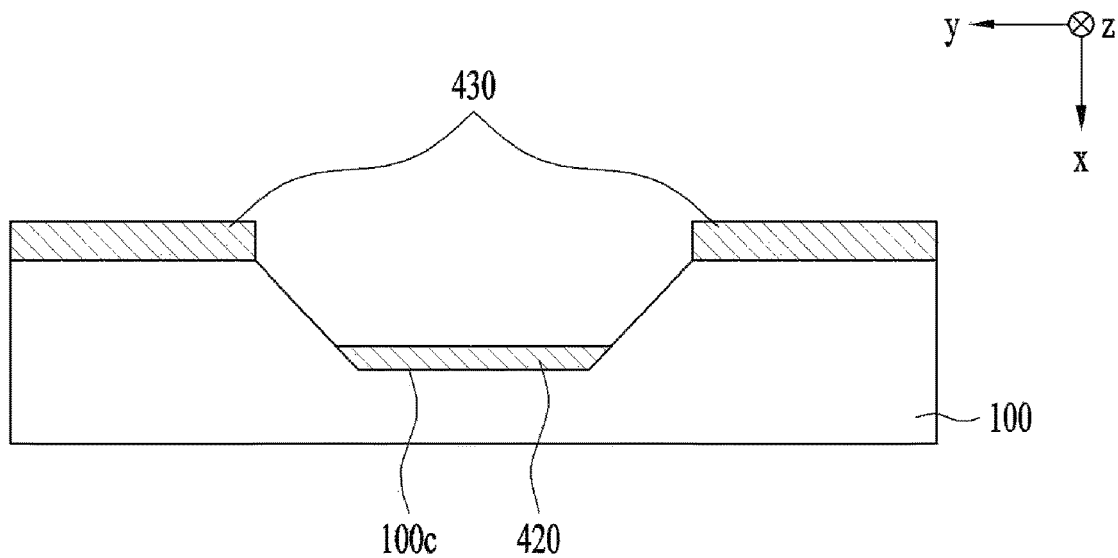
Figure 9C:
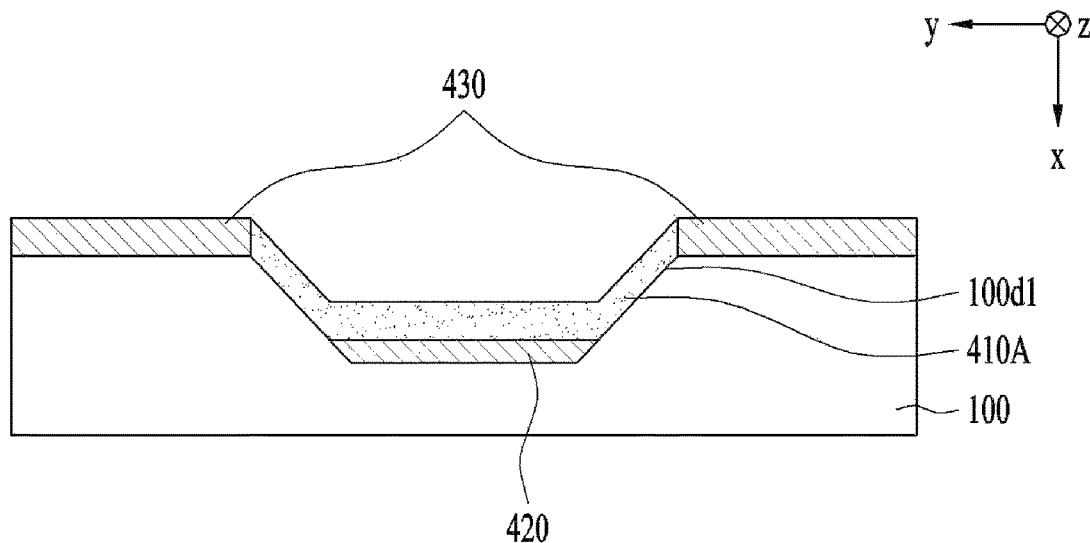

Subsequently, referring to FIG. 8B and FIG. 9B, in the non-effective area UA around the effective area AA of the substrate 100, the second decorative layer 420 may be formed on the bottom surface 100c of the cavity portion H and the third decorative layer 430 may be formed around the cavity portion H. Then, referring to FIG. 8C and FIG. 9C, the first decorative layer 410A may be formed, via deposition, on the top of the second decorative layer 420 inside the cavity portion H and on the side surface 100d1 of the cavity portion H.

In the case where the first decorative layer 410A1 having the structure illustrated in FIG. 7A is manufactured, the first oxide layer 412 may be formed, via deposition, on the top of the second decorative layer 420 and the side surface 100d1 of the cavity portion H within the cavity portion H, formed in the second surface 100b of the non-effective area UA of the substrate 100. Subsequently, the second oxide layer 414 may be formed, via deposition, on the first oxide layer 412. Then, the first metal layer 418 may be formed, via deposition, on the second oxide layer 414. When the third oxide layer 416 is formed, via deposition, on the first metal layer 418, the manufacturing of the first decorative layer 410A1 may be completed.

Figure 9D:
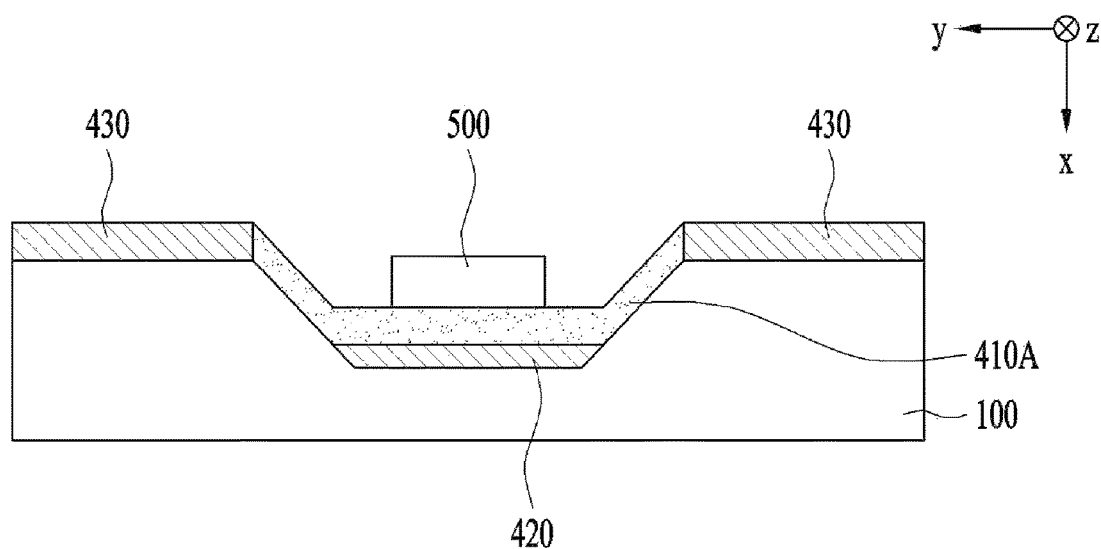

In the case where the first decorative layer 410A2 having the structure illustrated in FIG. 7B is manufactured, the first oxide layer 411 may be formed, via deposition, on the top of the second decorative layer 420 and on the side surface 100d1 of the cavity portion H within the cavity portion H, formed in the second surface 100b of the non-effective area UA of the substrate 100. Subsequently, the second metal layer 417 may be formed, via deposition, on the first oxide layer 411. Next, the second oxide layer 413 may be formed, via deposition, on the second metal layer 417. Then, the third metal layer 419 may be formed, via deposition, on the second oxide layer 413. When the third oxide layer 415 is formed, via deposition, on the third metal layer 419, the manufacturing of the first decorative layer 410A2 may be completed. Subsequently, as illustrated in FIG. 9D, the fingerprint sensor 500 may be provided on the first decorative layer 410A, i.e. the third oxide layer 416 or 415.

Although the decorative layer 400, 400A or 400B in the non-effective area UA of the substrate 100 is illustrated as including both the second and third decorative layers 420 and 430, the embodiment is not limited thereto. According to another embodiment, at least one of the second decorative layer 420 or the third decorative layer 430 may be omitted in the non-effective area UA of the substrate 100.

The plan view of the touch-sensing apparatus 1000A according to the embodiment is not limited to what is illustrated in FIG. 1. The touch-sensing apparatus 1000A may have any of various plan shapes so long as the substrate 100 and the decorative layer 400, 400A, or 400B have the cross-sectional structure illustrated in FIG. 4 to FIG. 6.

Hereinafter, various embodiments 1000B to 1000D of the touch-sensing apparatus including the above-described decorative layer 400A or 400B illustrated in FIGS. 4 to 6 are described with reference to the accompanying drawings. In the touch-sensing apparatuses 1000B to 1000D described below, members that perform the same role as members included in the touch-sensing apparatus 1000A illustrated in FIG. 1 may have the same reference numerals, and a repeated description thereof has been omitted.

Figure 10:
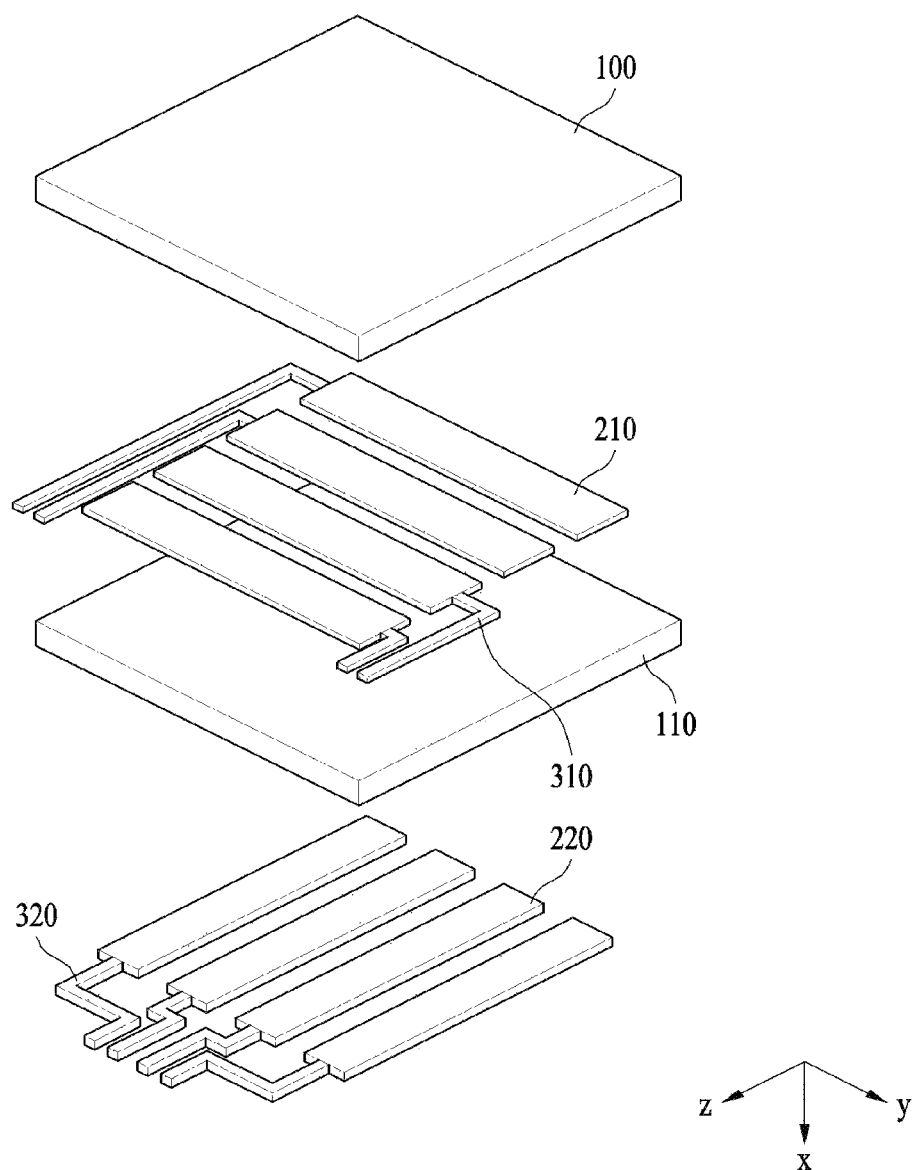
FIG. 10 is a perspective view illustrating a touch-sensing apparatus according to another embodiment.

Referring to FIG. 10, the touch-sensing apparatus 1000B according to another embodiment may include first and second substrates 100 and 110, the first sensing electrode 210, the second sensing electrode 220, the first wiring electrode 310, and the second wiring electrode 320. The first sensing electrode 210 that extends in a given direction and the first wiring electrode 310 connected to the first sensing electrode 210 may be provided on one surface of the first substrate 100. The second sensing electrode 220 that extends in a direction different from the given direction, and the second wiring electrode 320 connected to the second sensing electrode 220 may be provided on one surface of the second substrate 110.

Instead of providing the first sensing electrode 210 and the first wiring electrode 310 on the first substrate 100, the first and second sensing electrodes 210 and 220 and the first and second wiring electrodes 310 and 320 may be provided only on the two surfaces of the second substrate 110. The first sensing electrode 210 that extends in a given direction and the first wiring electrode 310 connected to the first sensing electrode 210 may be provided on one surface of the second substrate 110, and the second sensing electrode 220 that extends in a direction different from the given direction and the second wiring electrode 320 connected to the second sensing electrode 220 may be provided on the other surface of the second substrate 110.

Figure 11:
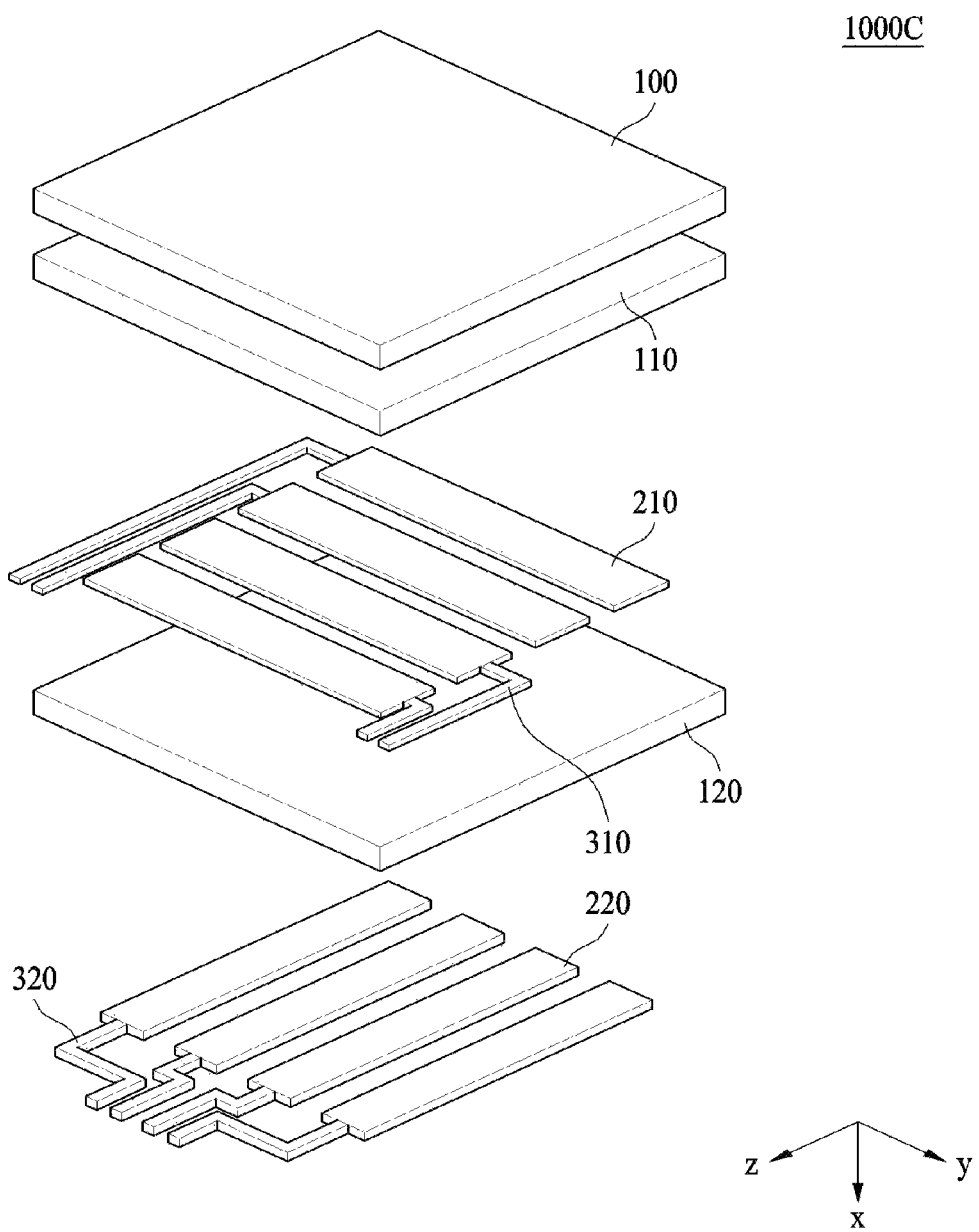
FIG. 11 is a perspective view illustrating a touch-sensing apparatus according to still another embodiment.

Referring to FIG. 11, the touch-sensing apparatus 1000C according to still another embodiment may include first to third substrates 100, 110, and 120, the first and second sensing electrodes 210 and 220, and the first and second wiring electrodes 310 and 320. The first sensing electrode 210 that extends in a given direction and the first wiring electrode 310 connected to the first sensing electrode 210 may be provided on one surface of the second substrate 110. The second sensing electrode 220 that extends in a direction different from the given direction and the second wiring electrode 320 connected to the second sensing electrode 220 may be provided on one surface of the third substrate 120.

Figure 12:
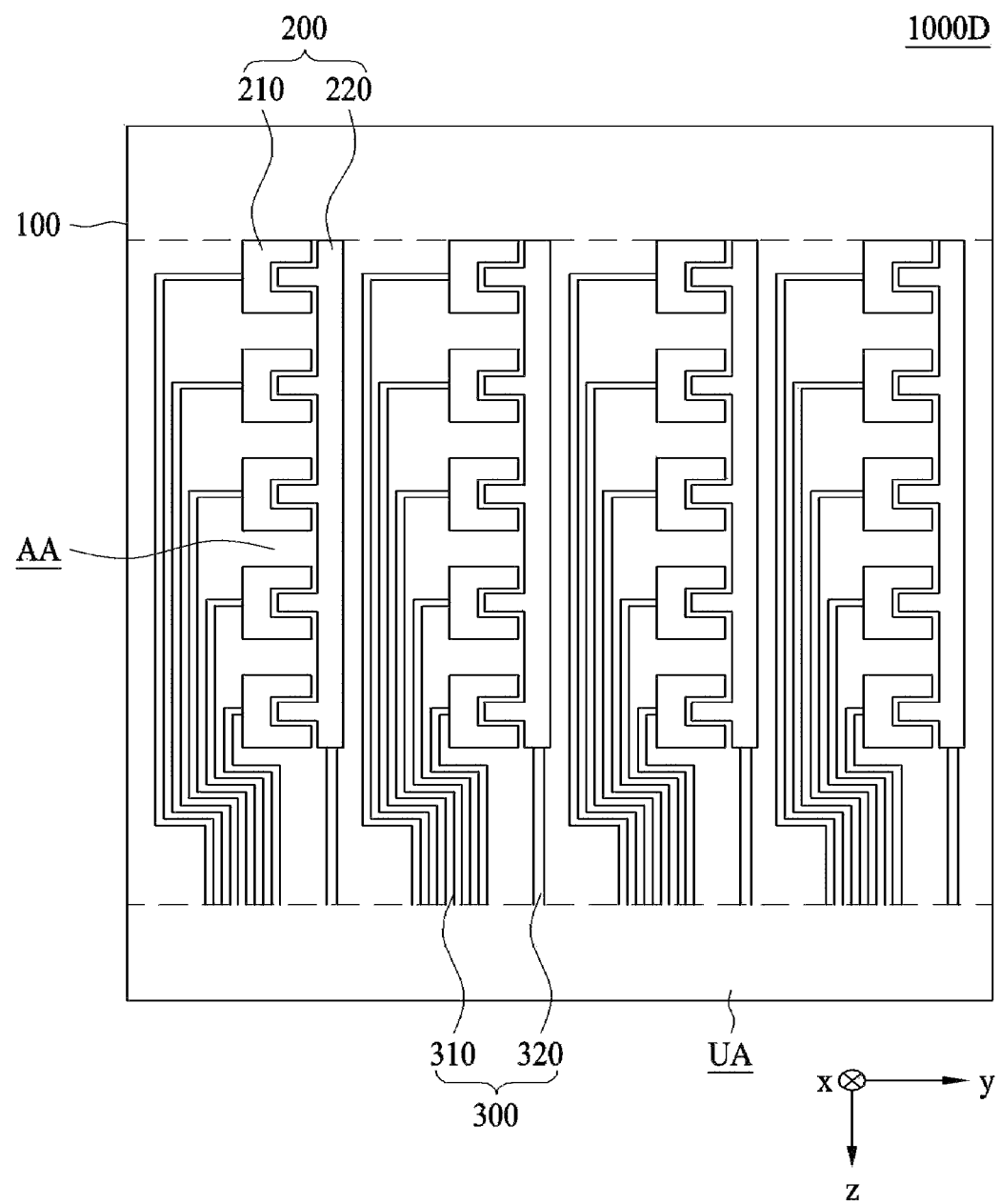
FIG. 12 is a plan view illustrating a touch-sensing apparatus according to still another embodiment.

Referring to FIG. 12, the touch-sensing apparatus 1000D may include the substrate 100, the first sensing electrode 210, and the second sensing electrode 220. The first sensing electrode 210 and the second sensing electrode 220 may be provided to be spaced apart from each other on the same surface of the substrate 100. The first sensing electrode 210 and the first wiring electrode 310 connected to the first sensing electrode 210 may be provided in the effective area AA and the non-effective area UA of the substrate 100, and the second sensing electrode 220 and the second wiring electrode 320 connected to the second sensing electrode 220 may be provided in the effective area AA and the non-effective area UA of the substrate 100.

The fingerprint sensor 500 included in the above-described touch-sensing apparatuses 1000A to 1000D may be used for various purposes. For example, the fingerprint sensor 500 may be used in a field in which user authentication may be required. A case in which user authentication is required may be, for example, unlocking, approval of or non-repudiation of online trading, access to device systems including websites and e-mails and services, change of passwords and PINs, physical access to, for example, a door lock, various verifications in time and attendance management systems, mobile phones, finger-based input devices/navigation systems for gaming, or the use of finger-based shortcuts. The fingerprint sensor 500 may be required in various fields including, for example, user authentication, registration, approval, or security.

The above-described touch-sensing apparatuses 1000A to 1000D may be applied to a touch device that may be coupled to a display panel. For example, the touch-sensing apparatuses 1000A to 1000D may be coupled to a display panel via a second adhesive layer. Touch devices 2000A to 2000C including the above-described touch-sensing apparatus and a display panel according to embodiments are described with reference to the accompanying drawings. In the touch devices 2000A to 2000C, the same constituent elements as those illustrated in the touch-sensing apparatuses 1000A, 1000B, 1000C and 1000D according to the above-described embodiments may be given the same reference numerals, and a repeated description thereof has been omitted.

Figure 13:
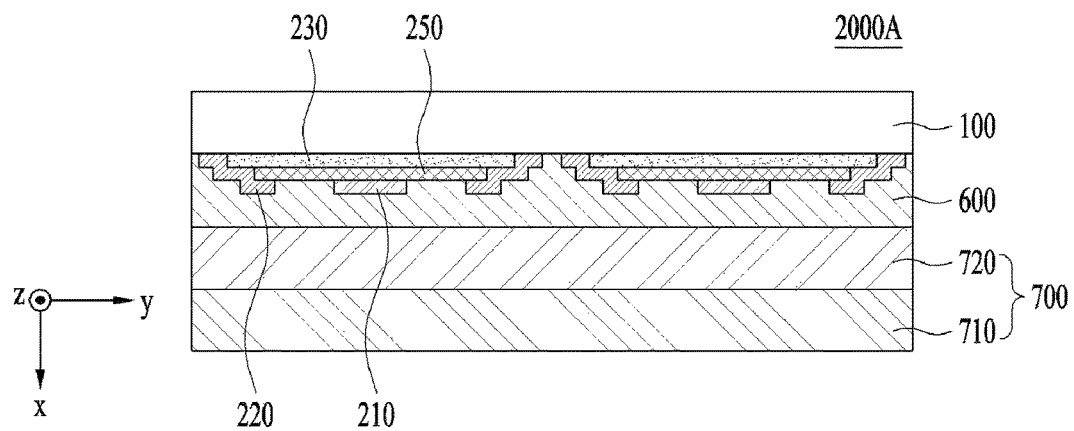
FIG. 13 is a cross-sectional view illustrating a touch device according to an embodiment.

FIG. 13 is a cross-sectional view illustrating the touch device 2000A, which may include a touch-sensing apparatus having the sensing electrodes and the wiring electrodes provided in an add-on type, according to an embodiment. The touch device 2000A illustrated in FIG. 13 may include the touch-sensing apparatus and a display panel 700. The touch-sensing apparatus may be provided on the display panel 700. The touch device 2000A may be formed by coupling the substrate 100 and the display panel 700 to each other.

The substrate 100 and the display panel 700 may be adhered to each other via a second adhesive layer 600. For example, the substrate 100 and the display panel 700 may be bonded to each other via the second adhesive layer 600, which may include an optically transparent adhesive, such as, e.g., an optically clear adhesive (OCA) or an optically clear resin (OCR).

The display panel 700 may include a first panel substrate 710 and a second panel substrate 720. When the display panel 700 is a liquid-crystal display panel, the display panel 700 may be configured such that the first panel substrate 710, which may include a thin film transistor (TFT) and a pixel electrode, and the second panel substrate 720, which may include multiple color filter layers, are bonded to each other with a liquid-crystal layer provided therebetween.

In addition, the display panel 700 may be a liquid-crystal display panel having a color-filter-on-transistor (COT) structure in which a thin film transistor, a color filter, and a black matrix are formed on the first panel substrate 710 and the second panel substrate 720 is bonded to the first panel substrate 710 with the liquid-crystal layer provided therebetween. The thin film transistor may be formed on the first panel substrate 710, a protective layer may be formed on the thin film transistor, and the color filter layers may be formed on the protective layer.

The first panel substrate 710 may be provided with the pixel electrode, which may come into contact with the thin film transistor. In order to increase the aperture ratio and to simplify a mask process, the black matrix may be omitted and a common electrode may also serve as the black matrix. When the display panel 700 is a liquid-crystal display panel, a backlight unit may be further provided on the back surface of the display panel 700 so as to emit light.

If the display panel 700 is an organic field emission display panel, the display panel 700 may be a self-illuminating device that requires no separate light source. In the display panel 700, the thin film transistor may be formed on the first panel substrate 710, and an organic light-emitting element may be formed so as to come into contact with the thin film transistor. The organic light-emitting element may include an anode, a cathode, and an organic light-emitting layer formed between the anode and the cathode. The display panel 700 may further include the second panel substrate 720, which may serve as an encapsulation substrate, on the organic light-emitting element.

Figure 14:
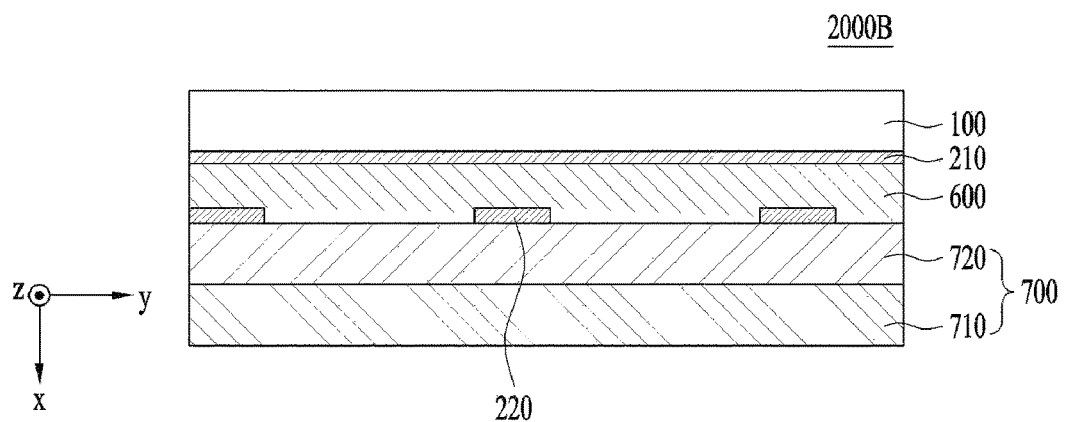
FIG. 14 is a cross-sectional view illustrating a touch device according to another embodiment.

The touch device 2000B, which may include a touch-sensing apparatus having the sensing electrodes 210 and 220 and the wiring electrodes provided in an on-cell type, is described with reference to FIG. 14. The touch device 2000B illustrated in FIG. 14 may include the substrate 100, the first and second sensing electrodes 210 and 220, the second adhesive layer 600, and the display panel 700.

In the touch device 2000B, the touch-sensing apparatus may be integrally formed with the display panel 700. In this case, the substrate 100 that supports the sensing electrodes 210 and 220 may be omitted. At least one sensing electrode 210 and/or 220 may be provided on at least one surface of the display panel 700. At least one sensing electrode 210 and/or 220 may be formed on at least one surface of the first panel substrate 710 or the second panel substrate 720.

The first sensing electrode 210 and a first wiring connected to the first sensing electrode 210 may be provided on one surface of the substrate 100. The second sensing electrode 220 may be provided on one surface of the display panel 700. In addition, a second wiring connected to the second sensing electrode 220 may be provided.

The second adhesive layer 600 may be provided between the substrate 100 and the display panel 700 so as to bond the substrate 100 and the display panel 700 to each other. A polarizing plate may be further provided below the substrate 100. The polarizing plate may be a linear polarizing plate or an external light reflection prevention polarizing plate. For example, when the display panel 700 is a liquid-crystal display panel, the polarizing plate may be a linear polarizing plate. When the display panel 700 is an organic field emission display panel, the polarizing plate may be an external light reflection prevention polarizing plate.

The touch device 2000C, which may include a touch-sensing apparatus including the sensing electrodes 210 and 220 and the wirings or electrodes provided in an in-cell type, is described with reference to FIG. 15. The touch device 2000C illustrated in FIG. 15 may include the display panel 700 and the touch-sensing apparatus. The touch-sensing apparatus may be integrally formed with the display panel 700, and the substrate 100 that supports at least one sensing electrode 210 and/or 220 may be omitted.

For example, a sensing electrode that is provided in the effective area AA and serves as a sensor for sensing a touch and a wiring that applies an electrical signal to the sensing electrode may be formed inside the display panel 700. At least one sensing electrode or at least one wiring may be formed inside the display panel 700.

The display panel 700 may include the first panel substrate 710 and the second panel substrate 720. At least one sensing electrode, from among a first sensing electrode and a second sensing electrode, may be provided between the first panel substrate 710 and the second panel substrate 720. For example, at least one sensing electrode may be provided on at least one surface of the first panel substrate 710 or the second panel substrate 720.

Figure 15:
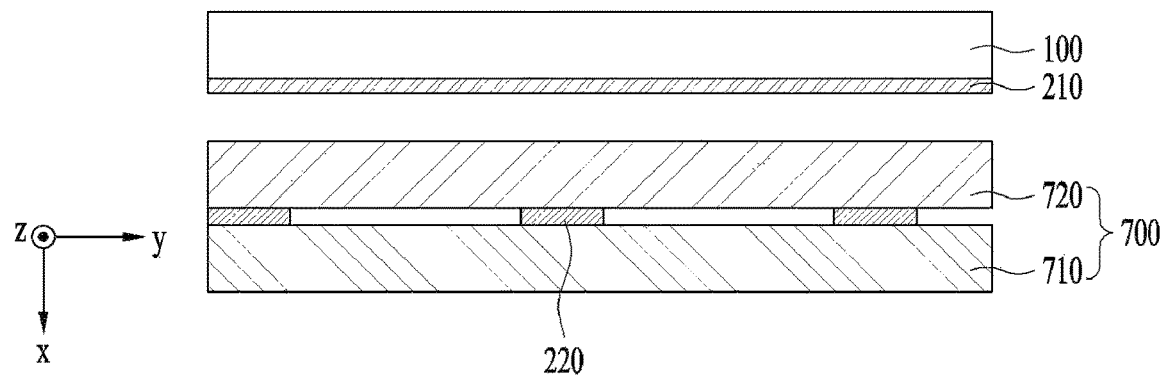
FIG. 15 is a cross-sectional view illustrating a touch device according to still another embodiment.

In FIG. 15, the first sensing electrode 210 and a first wiring connected to the first sensing electrode 210 may be provided on one surface of the substrate 100. The second sensing electrode 220 and a second wiring may be provided between the first panel substrate 710 and the second panel substrate 720. The second sensing electrode 220 and the second wiring may be provided inside the display panel 700, and the first sensing electrode 210 and the first wiring may be provided outside the display panel 700.

The second sensing electrode 220 and the second wiring may be provided on an upper surface of the first panel substrate 710 or a back surface of the second panel substrate 720. A polarizing plate may be further provided below the substrate 100. When the display panel is a liquid-crystal display panel and the second sensing electrode 220 is formed on the upper surface of the first panel substrate 710, the second sensing electrode 220 may be formed along with a thin film transistor (TFT) or a pixel electrode. When the second sensing electrode 220 is formed on the back surface of the second panel substrate 720, a color filter layer may be formed on the second sensing electrode 220, or the sensing electrode 220 may be formed on the color filter layer. When the display panel 700 is an organic field emission display panel and the second sensing electrode 220 is formed on the upper surface of the first panel substrate 710, the second sensing electrode 220 may be formed along with a thin film transistor or an organic light-emitting element.

In the touch device 2000C according to the embodiment, at least one substrate 100 that supports the sensing electrode 210 may be omitted. Thus, the touch device 2000C may have a decreased thickness and a reduced weight. In addition, when the sensing electrode 210 and the wiring are formed along with the constituent element of the display panel 700, processing may be simplified and manufacturing costs may be reduced.

The touch-sensing apparatuses 1000A to 1000D according to the embodiments may be applied to various fields that require a fingerprint sensor. In addition, the touch-sensing apparatuses 1000A to 1000D or the touch devices 2000A to 2000C may be applied to various electronic appliances. For example, electronic appliances including the touch-sensing apparatuses 1000A to 1000D or the touch devices 2000A to 2000C may be mobile phones, smart phones, portable digital assistants (PDAs), portable multimedia players (PMPs), or portable terminals such as laptop computers, but the embodiment is not limited thereto.

Figure 16:
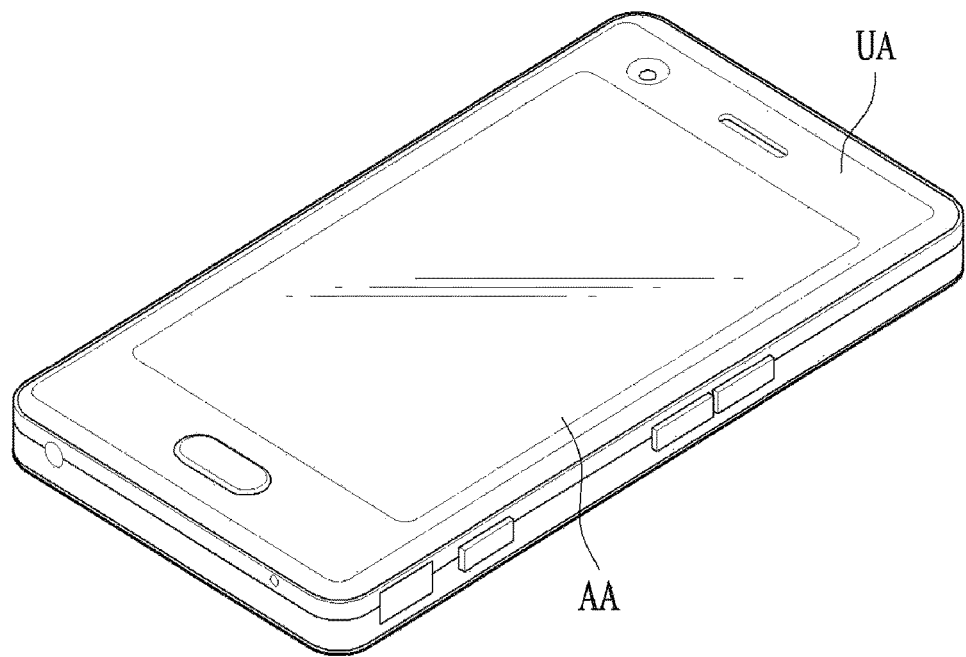
FIG. 16 is a perspective view illustrating a portable terminal according to an embodiment.

An electronic appliance including the touch-sensing apparatuses 1000A to 1000D according to the above-described embodiments is described with reference to the accompanying drawing. The electronic appliance may be a portable terminal. Referring to FIG. 16, the portable terminal may include the effective area AA and the non-effective area UA. The portable terminal may perform predetermined functions such as, e.g., a function of sensing a touch signal when the finger touches the effective area AA and a function of turning the power of the electronic appliance on/off or releasing a sleep mode when the finger touches the cavity portion H into which the fingerprint sensor 500 is inserted in the non-effective area UA.

When a touch-sensing apparatus is a flexible touch-sensing apparatus, a touch device including the touch-sensing apparatus may be a flexible touch device, and an electronic appliance including the touch device may also be a flexible electronic appliance that may be bendable or foldable by the user's hand. Such a flexible touch-sensing apparatus may be applied to, for example, a wearable touch field.

The touch-sensing apparatus may be applied not only to a touch device such as, for example, a mobile terminal, but also to an electronic appliance such as, for example, a vehicle navigation system. In addition, a touch-sensing apparatus, a touch device including the apparatus, and an electronic appliance including the touch-sensing apparatus or the touch device according to embodiments may be applied to internal parts of a vehicle. The electronic appliance including the touch-sensing apparatus or the touch device according to the embodiments may be applied to various parts inside a vehicle. For example, the electronic appliance including the touch-sensing apparatus or the touch device according to the embodiments may be applied not only to a personal navigation display (PND) but also to a dashboard so as to create a center information display (CID). However, the embodiment is not limited thereto, and of course, there may be various other electronic appliances.

A touch-sensing apparatus, a touch device including the apparatus, and an electronic appliance according to the embodiment may cause no noise in results sensed by a fingerprint sensor and may improve the sensitivity of the fingerprint-sensing results compared to the related art, even with a ring-shaped first decorative layer that provides a metallic texture.

Embodiments provide a touch-sensing apparatus having a decorative layer that causes no noise in sensor results, a touch device including the apparatus, and an electronic appliance. A touch-sensing apparatus may include may include a substrate including an effective area and a non-effective area, a cavity provided in the non-effective area, a fingerprint sensor provided on a bottom surface of the cavity, and a first decorative layer provided inside the cavity and having a plurality of oxide layers. The first decorative layer may include at least one metal layer provided between the plurality of oxide layers. The metal layer may have a thickness ranging from 10 nm to 50 nm.

The first decorative layer may be provided on at least one of the bottom surface or a side surface of the cavity portion. The touch-sensing apparatus may further include a second decorative layer provided between the bottom surface of the cavity portion and the fingerprint sensor, and a third decorative layer provided around the cavity portion in the non-effective area. A first thickness of the first decorative layer may be less than a second thickness of the second decorative layer.

The at least one metal layer may include a plurality of metal layers provided respectively between the oxide layers, and a sum of thicknesses of the metal layers may range from 10 nm to 50 nm. The metal layers may have the same thickness, or may have different thicknesses.

Each of the oxide layers may include at least one of titanium dioxide ($TiO_2$), silicon dioxide ($SiO_2$), aluminum oxide ($Al_2O_3$), hafnium oxide ($HfO_2$), zinc oxide (ZnO), magnesium oxide (MgO), cesium oxide ($Ce_2O_3$), indium oxide ($In_2O_3$), indium tin oxide (ITO), or barium titanate ($BaTiO_3$). The at least one metal layer may include at least one of indium (In), tin (Sn), aluminum (Al), silver (Ag), nickel (Ni), chromium (Cr), platinum (Pt), molybdenum (Mo), copper (Cu), or gold (Au), or an alloy thereof.

The substrate may include a first surface to be touched by a touch subject, and a second surface being opposite to the first surface, the cavity portion being provided in the second surface. The first decorative layer may have a shape of a ring shape.

The oxide layers may include a first oxide layer provided on the bottom surface of the cavity portion, a second oxide layer provided on the first oxide layer, and a third oxide layer provided on the second oxide layer. The at least one metal layer may include a first metal layer provided between the first and second oxide layers or between the second and third oxide layers. The at least one metal layer may include a second metal layer provided between the first and second oxide layers, and a third metal layer provided between the second and third oxide layers.

Each of the first and third oxide layers may include $TiO_2$, and the second oxide layer may include $SiO_2$. The first metal layer may include Sn. The second metal layer may include In and the third metal layer may include Sn.

The touch-sensing apparatus may further include an adhesive layer provided between the bottom surface of the cavity portion and the fingerprint sensor. The adhesive layer may include a first adhesive portion provided between the bottom surface of the cavity portion and the fingerprint sensor, and a second adhesive portion configured to extend from the first adhesive portion and provided between the side surface of the cavity portion and the fingerprint sensor.

The first decorative layer may be provided on each of the bottom surface and the side surface of the cavity portion, and the adhesive layer may be provided between the first decorative layer and the fingerprint sensor. The fingerprint sensor may include a third surface configured to face the bottom surface of the cavity portion, and a fourth surface being opposite to the third surface, and the touch-sensing apparatus may further include an auxiliary substrate provided on the fourth surface of the fingerprint sensor. The first decorative layer may be provided on the side surface of the cavity portion, and the cavity portion may have an opening having a width that is equal to or less than a width of the auxiliary substrate.

In another embodiment disclosed herein, a touch device may include the touch-sensing apparatus, and a display panel connected to the touch-sensing apparatus. In a further embodiment, an electronic appliance may include the touch-sensing apparatus or the touch device.

In the previous description of the embodiments, it will be understood that, when each element is referred to as being formed "on" or "under" the other element, it may be directly "on" or "under" the other element or be indirectly formed with one or more intervening elements therebetween. In addition, it will also be understood that "on" or "under" the element may mean an upward direction and a downward direction of the element. Relative terms such as, for example, "first", "second", "on/upper/above" and "beneath/lower/below", used in the previous description may be used to distinguish any one substance or element with another substance or element without requiring or containing any physical or logical relationship or sequence between these substances or elements.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch-sensing apparatus, comprising: a substrate including an effective area and a non-effective area; a cavity provided in the non-effective area; a fingerprint sensor provided on a bottom surface of the cavity; and a first decorative layer provided inside the cavity and having a plurality of oxide layers, wherein the first decorative layer includes at least one metal layer provided between the plurality of oxide layers, and the at least one metal layer has a thickness ranging from 10 nm to 50 nm; wherein the substrate includes: a first surface to receive a touch input; and a second surface opposite the first surface, the cavity being provided in the second surface; wherein the fingerprint sensor includes: a third surface configured to face the bottom surface of the cavity; and a fourth surface being opposite to the third surface, and wherein the touch-sensing apparatus further includes an auxiliary substrate provided on the fourth surface of the fingerprint sensor.

2. The touch-sensing apparatus according to claim 1, wherein the first decorative layer is provided on at least one of the bottom surface of the cavity or a side surface of the cavity.

3. The touch-sensing apparatus according to claim 2, further comprising:
   a second decorative layer provided between the bottom surface of the cavity and the fingerprint sensor; and
   a third decorative layer provided around the cavity in the non-effective area.

4. The touch-sensing apparatus according to claim 1, wherein the at least one metal layer includes a plurality of metal layers provided respectively between the plurality of oxide layers, and wherein a sum of thicknesses of the plurality of metal layers ranges from 10 nm to 50 nm.

5. The touch-sensing apparatus according to claim 1, wherein each of the plurality of oxide layers includes at least one of titanium dioxide ($TiO_2$), silicon dioxide ($SiO_2$), aluminum oxide ($Al_2O_3$), hafnium oxide ($HfO_2$), zinc oxide (ZnO), magnesium oxide (MgO), cesium oxide ($Ce_2O_3$), indium oxide ($In_2O_3$), indium tin oxide (ITO), or barium titanate ($BaTiO_3$).

6. The touch-sensing apparatus according to claim 1, wherein the at least one metal layer includes at least one of indium (In), tin (Sn), aluminum (Al), silver (Ag), nickel (Ni), chromium (Cr), platinum (Pt), molybdenum (Mo), copper (Cu), or gold (Au), or an alloy thereof.

7. The touch-sensing apparatus according to claim 1, wherein the first decorative layer has a ring shape.

8. The touch-sensing apparatus according to claim 1, wherein the plurality of oxide layers include:
- a first oxide layer provided on the bottom surface of the cavity;
- a second oxide layer provided on the first oxide layer; and
- a third oxide layer provided on the second oxide layer.

9. The touch-sensing apparatus according to claim 8, wherein the at least one metal layer includes a first metal layer provided between the first and second oxide layers or between the second and third oxide layers.

10. The touch-sensing apparatus according to claim 8, wherein the at least one metal layer includes:
- a second metal layer provided between the first and second oxide layers; and
- a third metal layer provided between the second and third oxide layers.

11. The touch-sensing apparatus according to claim 9, wherein each of the first and third oxide layers includes $TiO_2$, the second oxide layer includes $SiO_2$, and the first metal layer includes Sn.

12. The touch-sensing apparatus according to claim 10, wherein each of the first and third oxide layers includes $TiO_2$, the second oxide layer includes $SiO_2$, the second metal layer includes In, and the third metal layer includes Sn.

13. The touch-sensing apparatus according to claim 2, further comprising an adhesive layer provided between the bottom surface of the cavity and the fingerprint sensor.

14. The touch-sensing apparatus according to claim 13, wherein the adhesive layer includes:
- a first adhesive portion provided between the bottom surface of the cavity and the fingerprint sensor; and
- a second adhesive portion configured to extend from the first adhesive portion and provided between the side surface of the cavity and the fingerprint sensor.

15. The touch-sensing apparatus according to claim 13, wherein the first decorative layer is provided on each of the bottom surface of the cavity and the side surface of the cavity, and the adhesive layer is provided between the first decorative layer and the fingerprint sensor.

16. The touch-sensing apparatus according to claim 1, wherein the first decorative layer is provided on the side surface of the cavity, and wherein the cavity has an opening having a width that is equal to or less than a width of the auxiliary substrate.

17. A touch device, comprising:
- the touch-sensing apparatus according to claim 1; and
- a display panel connected to the touch-sensing apparatus.

18. An electronic appliance comprising the touch-sensing apparatus according to claim 17.

* * * * *